(12) United States Patent
Huang et al.

(10) Patent No.: US 11,811,319 B2
(45) Date of Patent: *Nov. 7, 2023

(54) CHARGING SYSTEM, POWER SUPPLY SYSTEM AND DUAL MODE POWER CONVERSION CIRCUIT THEREOF

(71) Applicant: Richtek Technology Corporation, Zhubei (TW)

(72) Inventors: Tsung-Wei Huang, Taipei (TW); Shui-Mu Lin, Taichung (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 84 days.

This patent is subject to a terminal disclaimer.

(21) Appl. No.: 17/520,637

(22) Filed: Nov. 6, 2021

(65) Prior Publication Data

US 2022/0181973 A1 Jun. 9, 2022

Related U.S. Application Data

(60) Provisional application No. 63/121,857, filed on Dec. 4, 2020.

(30) Foreign Application Priority Data

May 13, 2021 (TW) .................................. 110117300

(51) Int. Cl.
*H02M 3/07* (2006.01)
*H02M 3/158* (2006.01)
*H02M 1/00* (2006.01)

(52) U.S. Cl.
CPC ......... *H02M 3/158* (2013.01); *H02M 1/0095* (2021.05); *H02M 3/07* (2013.01)

(58) Field of Classification Search
CPC ..................... H02M 3/07–078; H02M 1/0095
See application file for complete search history.

(56) References Cited

U.S. PATENT DOCUMENTS

2019/0379287 A1* 12/2019 Zhang .................... H02M 3/07

\* cited by examiner

*Primary Examiner* — Peter M Novak

(74) *Attorney, Agent, or Firm* — Tung & Associates

(57) ABSTRACT

A power conversion circuit includes an N-level PWM power converter and a switching capacitor power converter. The N-level PWM power converter includes shared switches shared with the switching capacitor power converter, and PWM switches. In an N-level PWM mode, the shared switches and the PWM switches periodically switch an inductor and a capacitor, to execute power conversion between a first power and a second power by N-level PWM switching operation. The switching capacitor power converter includes the shared switches and auxiliary switches. In a capacitive conversion mode, the shared switches and the auxiliary switches periodically switch the capacitor, to execute power conversion between the first power and the second power by capacitive power conversion operation. In the capacitive conversion mode, a portion of the plural PWM switches are always OFF such that one end of the inductor is floating.

25 Claims, 12 Drawing Sheets

CHARGING SYSTEM, POWER SUPPLY SYSTEM AND DUAL MODE POWER CONVERSION CIRCUIT THEREOF

CROSS REFERENCE

The present invention claims priority to U.S. 63/121,857 filed on Dec. 4, 2020 and claims priority to TW 110117300 filed on May 13, 2021.

BACKGROUND OF THE INVENTION

Field of Invention

The present invention relates to a charging system; particularly, it relates to a high-efficiency charging system including an N-level PWM power converter and a switching capacitor power converter. The present invention also relates to a power conversion circuit for use in such high-efficiency charging system.

Description of Related Art

Please refer to FIG. 1, which shows a schematic circuit block diagram of a conventional charging system 100. The conventional charging system 100 includes: a pulse width modulation (PWM) circuit 120, a capacitive current-enhanced circuit 130 and load switches SP1~SP4. A power delivery unit 10 delivers a DC power VDC (which can be a constant voltage or a constant current). The conventional charging system 100 can determine whether to select the PWM circuit 120 or the capacitor current-enhanced circuit 130 according to for example a relationship between the DC power VDC and a voltage of a battery 40 and a charging status of the battery 40, to switch an inductor L in the PWM circuit 120 by pulse width modulation to convert the DC power VDC to an output power VO and to thereby charge the battery 40, or to switch a capacitor CF in the capacitive current-enhanced circuit 130 by capacitive voltage division (corresponding to current multiplication) to convert the DC power VDC to the output power VO and to thereby charge the battery 40.

The prior art shown in FIG. 1 has the following drawbacks that: first, it requires two power conversion circuits (i.e., 120 and 130) and many load switches (i.e., SP1~SP4), which is costly. Besides, the PWM circuit 120 is usually a 2-level PWM power converter, whose efficiency is not satisfactory. (By "2-level", it means that the switching node LX where the inductor connects to the PWM switches (not shown) has two voltage levels.)

Please refer to FIG. 2, which shows a schematic circuit diagram of a conventional charging system 200. In a 3-level PWM mode, the conventional charging system 200 operates switches S1~S4 to switch an inductor L and a capacitor CF, so as to execute power conversion by 3-level PWM operation; on the other hand, in a capacitive conversion mode, the conventional charging system 200 short-circuits the inductor L via a bypass switch SB, and operates the switches S1~S4 to switch the corresponding CF, so as to multiply an input current by a certain magnitude. (By "3-level", it means that the switching node LX where the inductor connects to the switches (S2 and S3 in this case) has three voltage levels.)

The prior art shown in FIG. 2 has the following drawbacks that: in the capacitive conversion mode, the power loss during ON (conduction) operation of the bypass switch SB increases as the charging current increases, thus undesirably reducing the power conversion efficiency.

In view of the above, to overcome the drawbacks in the prior art, the present invention proposes a dual mode power conversion circuit having an N-level PWM power converter and a switching capacitor power converter, wherein the N-level PWM power converter and the switching capacitor power converter share part of switches. According to a relationship between a DC power and a charging power, the power conversion circuit of the present invention can adaptively control the N-level PWM power converter and the capacitor to operate in an N-level PWM mode or in a capacitive conversion mode. As a consequence, the present invention can enhance power conversion efficiency of the entire charging system via flexible conversion arrangements.

SUMMARY OF THE INVENTION

From one perspective, the present invention provides a power conversion circuit, which is configured to operably convert a first power to a second power or convert the second power to the first power; the power conversion circuit comprising: an N-level PWM power converter, which is configured to operably switch an inductor and at least one capacitor in an N-level PWM mode, so as to execute power conversion between the first power and the second power; and a switching capacitor power converter, which is configured to operably switch the at least one capacitor in a capacitive conversion mode, so as to execute power conversion between the first power and the second power; wherein the N-level PWM power converter includes: a plurality of shared switches shared with the switching capacitor power converter; and a plurality of PWM switches, wherein in the N-level PWM mode, the plurality of shared switches and the plurality of PWM switches periodically switch the inductor and the at least one capacitor, so as to execute power conversion between the first power and the second power by N-level PWM switching operation, wherein N is an integer greater than or equal to three; wherein the switching capacitor power converter includes: the plurality of shared switches; and a plurality of auxiliary switches, wherein in the capacitive conversion mode, the plurality of shared switches and the plurality of auxiliary switches periodically switch the at least one capacitor, so as to execute power conversion between the first power and the second power by capacitive power conversion operation; wherein in the capacitive conversion mode, a portion of the plurality of PWM switches are always OFF, such that one end of the inductor is floating.

In one embodiment, in the N-level PWM mode, the plurality of auxiliary switches are always OFF, such that the at least one capacitor is always electrically disconnected from one of the first power and the second power.

In one embodiment, the N-level PWM power converter includes: a plurality of upper gate switches coupled in series between the first power and a switching node, wherein adjacent upper gate switches are coupled to a corresponding upper gate central node in between; and a plurality of lower gate switches coupled in series between the switching node and a ground node, wherein adjacent lower gate switches are coupled to a corresponding lower gate central node in between; and the switching capacitor power converter includes: a portion of the plurality of upper gate switches; a portion of the plurality of lower gate switches, wherein the portion of the plurality of upper gate switches and the portion of the plurality of lower gate switches are the plurality of shared switches; an upper gate auxiliary sub-switch having a first end coupled to the second power and having a second end coupled to a corresponding one of the upper gate central nodes; and a lower gate auxiliary sub-switch having a first end coupled to the second power and having a second end coupled to a corresponding one of the lower gate central nodes, wherein the upper gate auxiliary sub-switch and the lower gate auxiliary sub-switch are the plurality of auxiliary switches; wherein the inductor is coupled between the switching node and the second power; wherein the at least one capacitor has a first end coupled to a corresponding one of the upper gate central nodes and has a second end coupled to a corresponding one of the lower gate central nodes; wherein in the N-level PWM mode, the plurality of upper gate switches and the plurality of lower gate switches periodically switch the at least one capacitor, so as to generate an N-level voltage at the switching node, so that the inductor executes power conversion between the first power and the second power by N-level PWM switching operation; wherein in the capacitive conversion mode, the upper gate auxiliary sub-switch, the lower gate auxiliary sub-switch and the plurality of shared switches periodically switch the at least one capacitor, so that the at least one capacitor converts the first power to the second power by capacitive voltage division or so that the at least one capacitor converts the second power to the first power by charge pumping operation.

In one embodiment, in the N-level PWM mode, the upper gate auxiliary sub-switch and the lower gate auxiliary sub-switch are both always OFF, such that the at least one capacitor is always electrically disconnected from the second power.

In one embodiment, in the capacitive conversion mode, at least one of the plurality of upper gate switches which is not the plurality of shared switches is always OFF and at least one of the plurality of lower gate switches which is not the plurality of shared switches is always OFF, such that one end of the inductor which is coupled to the switching node is floating.

In one embodiment, in the N-level PWM mode, a ratio of a first voltage of the first power to a second voltage of the second power is correlated with a duty ratio corresponding to the N-level voltage.

In one embodiment, in the capacitive conversion mode, a ratio of a first voltage of the first power to a second voltage of the second power is equal to M, wherein M is a real number greater than one.

In one embodiment, M is equal to N minus one.

In one embodiment, when the power conversion circuit is configured to operably convert the first power to the second power, in the capacitive conversion mode, a first current of the first power is constant, such that a second current of the second power is constant, wherein the second current is M times the level of the first current.

In one embodiment, in the capacitive conversion mode: an upper gate switch of the plurality of shared switches includes: a plurality of upper gate shared sub-switches connected in parallel with one another, wherein during a soft start period, the plurality of upper gate shared sub-switches are sequentially turned ON according to a predetermined time sequence; and/or a lower gate switch of the plurality of shared switches includes: a plurality of lower gate shared sub-switches connected in parallel with one another, wherein during the soft start period, the plurality of upper gate shared sub-switches are sequentially turned ON according to a predetermined time sequence; whereby a surge current occurring during the soft start period is reduced.

In one embodiment, the plurality of upper gate switches include: a first upper gate switch and a second upper gate switch coupled in series between the first power and the switching node, wherein the first upper gate switch and the second upper gate switch are coupled to each other at an upper gate central node; the plurality of lower gate switches include: a first lower gate switch and a second lower gate switch coupled in series between the switching node and the ground node, wherein the first lower gate switch and the second lower gate switch are coupled to each other at a lower gate central node; wherein the first upper gate switch and the first lower gate switch are the plurality of shared switches; wherein the upper gate auxiliary sub-switch is coupled between the second power and the upper gate central node, whereas, the lower gate auxiliary sub-switch is coupled between the second power and the lower gate central node; wherein the at least one capacitor is coupled between the upper gate central node and the lower gate central node.

In one embodiment, the power conversion circuit repeatedly switches according to a switching period, wherein N is equal to three, such that in a 3-level PWM mode, during a first period of the switching period, the first upper gate switch and the second lower gate switch are ON, whereas, the second upper gate switch and the first lower gate switch are OFF, and, during a second period of the switching period, the first lower gate switch and the second lower gate switch are ON, whereas, the first upper gate switch and the second upper gate switch are OFF, and, during a third period of the switching period, the second upper gate switch and the first lower gate switch are ON, whereas, the first upper gate switch and the second lower gate switch are OFF, and, during a fourth period of the switching period, the first upper gate switch and the second upper gate switch are ON, whereas, the first lower gate switch and the second lower gate switch are OFF, such that a voltage at the switching node is periodically switched among the first voltage, the ground, and ½-fold of the first voltage; wherein the upper gate auxiliary sub-switch and the lower gate auxiliary sub-switch are always OFF, such that the at least one capacitor is always electrically disconnected from the second power.

In one embodiment, the power conversion circuit repeatedly switches according to a switching period, wherein M is equal to two, such that in the capacitive conversion mode, during a first period of the switching period, the first upper gate switch and the lower gate auxiliary sub-switch are ON, whereas, the upper gate auxiliary sub-switch and the first lower gate switch are OFF, and, during a second period of the switching period, the upper gate auxiliary sub-switch and the first lower gate switch are ON, whereas, the first upper gate switch and the lower gate auxiliary sub-switch are OFF, such that the first end of the at least one capacitor is periodically switched between the first voltage and the second voltage and such that the second end of the at least one capacitor is periodically switched between the second voltage and the ground; wherein the second upper gate switch and the second lower gate switch are always OFF, such that one end of the inductor is floating.

From another perspective, the present invention provides a charging system, comprising: a power delivery unit, which is configured to operably generate a DC power according to an input power; and a charging circuit connected to the power delivery unit in a removable operation, wherein the charging circuit is configured to operably convert the DC power to a charging power for charging a battery; wherein the charging circuit includes a power conversion circuit for converting a first power to a second power or converting the second power to the first power, the power conversion circuit including: an N-level PWM power converter, which is configured to operably switch an inductor and at least one capacitor in an N-level PWM mode, so as to execute power conversion between the first power and the second power; and a switching capacitor power converter, which is configured to operably switch the at least one capacitor in a capacitive conversion mode, so as to execute power conversion between the first power and the second power; wherein the N-level PWM power converter includes: a plurality of shared switches shared with the switching capacitor power converter; and a plurality of PWM switches, wherein in the N-level PWM mode, the plurality of shared switches and the plurality of PWM switches periodically switch the inductor and the at least one capacitor, so as to execute power conversion between the first power and the second power by N-level PWM switching operation, wherein N is an integer greater than or equal to three; wherein the switching capacitor power converter includes: the plurality of shared switches; and a plurality of auxiliary switches, wherein in the capacitive conversion mode, the plurality of shared switches and the plurality of auxiliary switches periodically switch the at least one capacitor, so as to execute power conversion between the first power and the second power by capacitive power conversion operation; wherein in the capacitive conversion mode, a portion of the plurality of PWM switches are always OFF, such that one end of the inductor is floating; wherein the first power corresponds to the DC power, whereas, the second power corresponds to the charging power, or wherein the second power corresponds to the DC power, whereas, the first power corresponds to the charging power.

From another perspective, the present invention provides a power supply system, comprising: a battery, which is configured to operably supply an electrical energy; and a power supply circuit coupled to the battery, wherein the power supply circuit is configured to operably convert the electrical energy to a power supply power for proving power to a load; wherein the power supply circuit includes a power conversion circuit for converting a first power to a second power or converting the second power to the first power, the power conversion circuit including: an N-level PWM power converter, which is configured to operably switch an inductor and at least one capacitor in an N-level PWM mode, so as to execute power conversion between the first power and the second power; and a switching capacitor power converter, which is configured to operably switch the at least one capacitor in a capacitive conversion mode, so as to execute power conversion between the first power and the second power; wherein the N-level PWM power converter includes: a plurality of shared switches shared with the switching capacitor power converter; and a plurality of PWM switches, wherein in the N-level PWM mode, the plurality of shared switches and the plurality of PWM switches periodically switch the inductor and the at least one capacitor, so as to execute power conversion between the first power and the second power by N-level PWM switching operation, wherein N is an integer greater than or equal to three; wherein the switching capacitor power converter includes: the plurality of shared switches; and a plurality of auxiliary switches, wherein in the capacitive conversion mode, the plurality of shared switches and the plurality of auxiliary switches periodically switch the at least one capacitor, so as to execute power conversion between the first power and the second power by capacitive power conversion operation; wherein in the capacitive conversion mode, a portion of the plurality of PWM switches are always OFF, such that one end of the inductor is floating; wherein the first power corresponds to the electrical energy, whereas, the second power corresponds to the power supply power, or wherein the second power corresponds to the electrical energy, whereas, the first power corresponds to the power supply power.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 3:
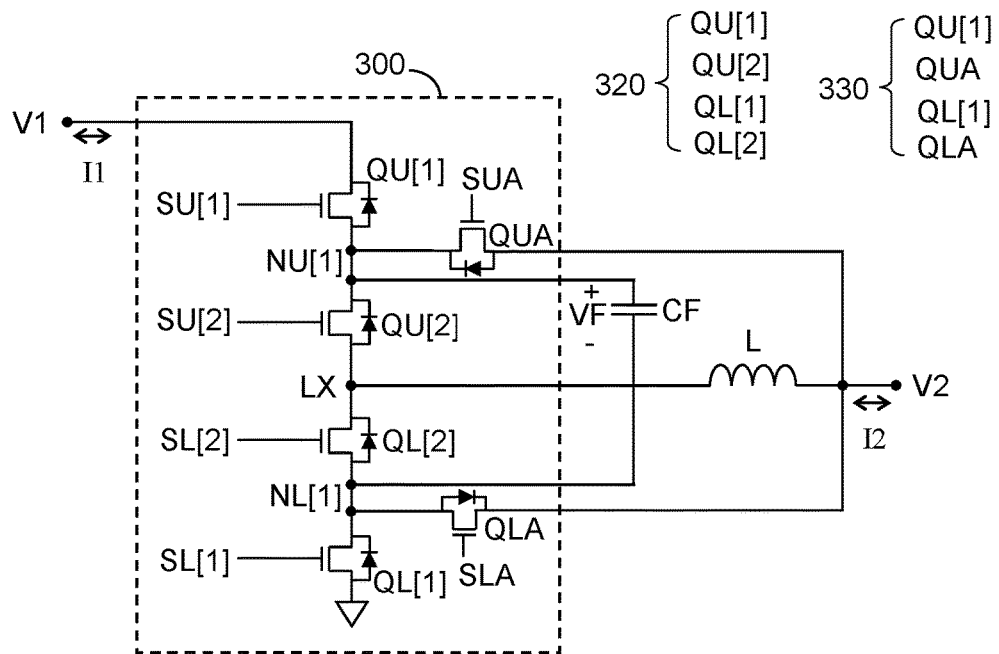
FIG. 3 shows a schematic diagram of a power conversion circuit according to a specific embodiment of the present invention.

Please refer to FIG. 3, which shows a schematic diagram of a power conversion circuit (i.e., power conversion circuit 300) according to a specific embodiment of the present invention. The power conversion circuit 300 is configured to operably convert a first power (corresponding to a first voltage V1 and a first current I1) to a second power (corresponding to a second voltage V2 and a second current I2) or convert the second power to the first power. The power conversion circuit 300 comprises: a 3-level PWM power converter 320 and a switching capacitor power converter 330.

The 3-level PWM power converter 320 is configured to operably switch an inductor L and at least one capacitor (e.g., capacitor CF) in a 3-level PWM mode, so as to execute power conversion between the first power and the second power. The switching capacitor power converter 330 is configured to operably switch the capacitor CF in a capacitive conversion mode, so as to execute power conversion between the first power and the second power.

In this embodiment, the 3-level PWM power converter 320 includes: upper gate switches and lower gate switches. To be more specific, the upper gate switches include: a first upper gate switch QU[1] and a second upper gate switch QU[2] coupled in series to each other between the first power and the switching node LX, wherein the first upper gate switch QU[1] and the second upper gate switch QU[2] are coupled to each other at an upper gate central node NU[1]. The lower gate switches include: a first lower gate switch QL[1] and a second lower gate switch QL[2] coupled in series to each other between the switching node LX and a ground, wherein the first lower gate switch QL[1] and the second lower gate switch QL[2] are coupled to each other at a lower gate central node NL[1]. In this embodiment, the inductor L is coupled between the switching node LX and the second power.

On the other hand, the switching capacitor converter 330 includes: the first upper gate switch QU[1], the first lower gate switch QL[1], an upper gate auxiliary sub-switch QUA and a lower gate auxiliary sub-switch QLA. In other words, the 3-level PWM power converter 320 and the switching capacitor power converter 330 share the first upper gate switch QU[1] and the first lower gate switch QL[1] (i.e., the first upper gate switch QU[1] and the first lower gate switch QL[1] are used by both the 3-level PWM power converter 320 and the switching capacitor power converter 330; these switches are referred to as "shared switches" in the context of the present invention). In this embodiment, the upper gate auxiliary sub-switch QUA is coupled between the second power and the upper gate central node NU[1], whereas, the lower gate auxiliary sub-switch QLA is coupled between the second power and the lower gate central node NL[1]. The capacitor CF is coupled between the upper gate central node NU[1] and the lower gate central node NL[1]. The above-mentioned upper gate switches are controlled by control signals SU[1]~SU[2], whereas, the above-mentioned lower gate switches are controlled by control signals SL[1]-SL[2], whereas, the above-mentioned auxiliary sub-switches QUA and QLA are controlled by control signals SUA and SLA, respectively.

Please still refer to FIG. 3. In the 3-level PWM mode, the power conversion circuit 300 is controlled by the control signals SU[1]~SU[2], so that the power conversion circuit 300 repeatedly switches according to a switching period, whereby in the 3-level PWM mode, during a first period of the switching period, the first upper gate switch QU[1] and the second lower gate switch QL[2] are ON, whereas, the second upper gate switch QU[2] and the first lower gate switch QL[1] are OFF, and, during a second period of the switching period, the first lower gate switch QL[1] and the second lower gate switch QL[2] are ON, whereas, the first upper gate switch QU[1] and the second upper gate switch QU[2] are OFF, and, during a third period of the switching period, the second upper gate switch QU[2] and the first lower gate switch QL[1] are ON, whereas, the first upper gate switch QU[1] and the second lower gate switch QL[2] are OFF, and, during a fourth period of the switching period, the first upper gate switch QU[1] and the second upper gate switch QU[2] are ON, whereas, the first lower gate switch QL[1] and the second lower gate switch QL[2] are OFF, such that a voltage at the switching node LX is periodically switched among three different voltage levels: the first voltage V1, the ground, and ½-fold of the first voltage V1, thereby achieving 3-level PWM switching.

It is worthwhile noting that, in the 3-level PWM mode, a ratio of the first voltage V1 of the first power to the second voltage V2 of the second power is correlated with a duty ratio corresponding to the above-mentioned 3-level voltage. Besides, the sequence of the above-mentioned first period, second period, third period and fourth period of the switching period can be arranged differently, depending upon practical needs. It should be understood that the switching sequence described in the above-mentioned embodiment is only an illustrative example, but not for limiting the broadest scope of the present invention. Besides, it is worthwhile noting that, in the 3-level PWM mode, the upper gate auxiliary sub-switch QUA and the lower gate auxiliary sub-switch QLA are both always OFF, such that the capacitor CF is always electrically disconnected from the second power.

Please still refer to FIG. 3. In the capacitive conversion mode, the power conversion circuit 300 repeatedly switches according to a switching period, such that in the capacitive conversion mode, during a first period of the switching period, the first upper gate switch QU[1] and the lower gate auxiliary sub-switch QLA are ON, whereas, the upper gate auxiliary sub-switch QUA and the first lower gate switch QL[1] are OFF, and, during a second period of the switching period, the upper gate auxiliary sub-switch QUA and the first lower gate switch QL[1] are ON, whereas, the first upper gate switch QU[1] and the lower gate auxiliary sub-switch QLA are OFF, such that the first end of the capacitor CF is periodically switched between the first voltage V1 and the second voltage V2 and such that the second end of the capacitor CF is periodically switched between the second voltage V2 and the ground. As a result, the first voltage V1 is 2 times the level of the second voltage V2, whereas, the second current I2 is 2 times the level of the first current I1. The switching period in the capacitive conversion mode and the switching period in the 3-level PWM mode can be the same as each other or different from each other.

It is worthwhile noting that, in the capacitive conversion mode, the second upper gate switch QU[2] and the second lower gate switch QL[2] are always OFF, such that the switching node LX is open. That is, one end of the inductor L which is coupled to the switching node LX is floating.

Figure 4A:
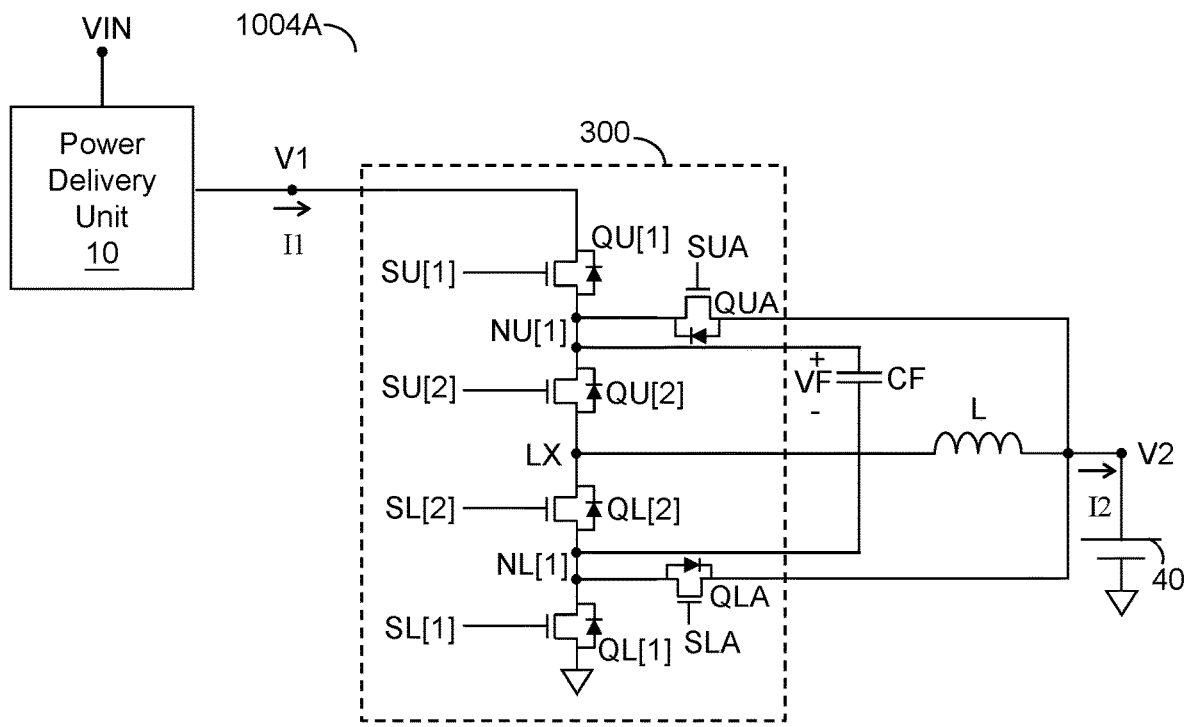
FIG. 4A to FIG. 4B show two specific embodiments of a charging system of the present invention, respectively.

Please refer to FIG. 4A, which shows a specific embodiment of a charging system (i.e., charging system 1004A) of the present invention. The charging system 1004A comprises: a power delivery unit 10 and a power conversion circuit 300. The power delivery unit 10 is configured to operably generate a first power according to an input power (e.g., VIN). In one embodiment, the first power is a DC power.

In one embodiment, the power delivery unit 10 can be an AC-DC converter circuit such as a mobile adapter. Under such situation, the input power VIN is an AC power. In another embodiment, the power delivery unit 10 can be a DC-DC converter circuit such as a power bank. Under such situation, the input power VIN is a DC power supplied by another battery. In one embodiment, the power delivery unit 10 complies with for example USB PD specification, which can output the first power with adjustable constant voltage or adjustable constant current.

The power conversion circuit 300 is connected to the power delivery unit 10 in a removable operation. For example, the power conversion circuit 300 is connected to the power delivery unit 10 via a connector or a cable. The power conversion circuit 300 is configured to operably convert the first power to a charging power for charging a battery 40. In this embodiment, the charging power corresponds to the second power shown in FIG. 4A (i.e., the second voltage V2 is the charging voltage, whereas, the second current I2 is the charging current). In other words, in this embodiment, the power conversion circuit 300 executes a buck conversion operation in the 3-level PWM mode or the power conversion circuit 300 executes a capacitive voltage division (corresponding to current multiplication) operation in the capacitive conversion mode. In one embodiment, the first current I1 generated by the power delivery unit 10 is constant, such that the second current I2 is constant, wherein the second current I2 is 2 times the level of the first current I1 (i.e., this situation is the so-called "current multiplication").

Figure 4B:
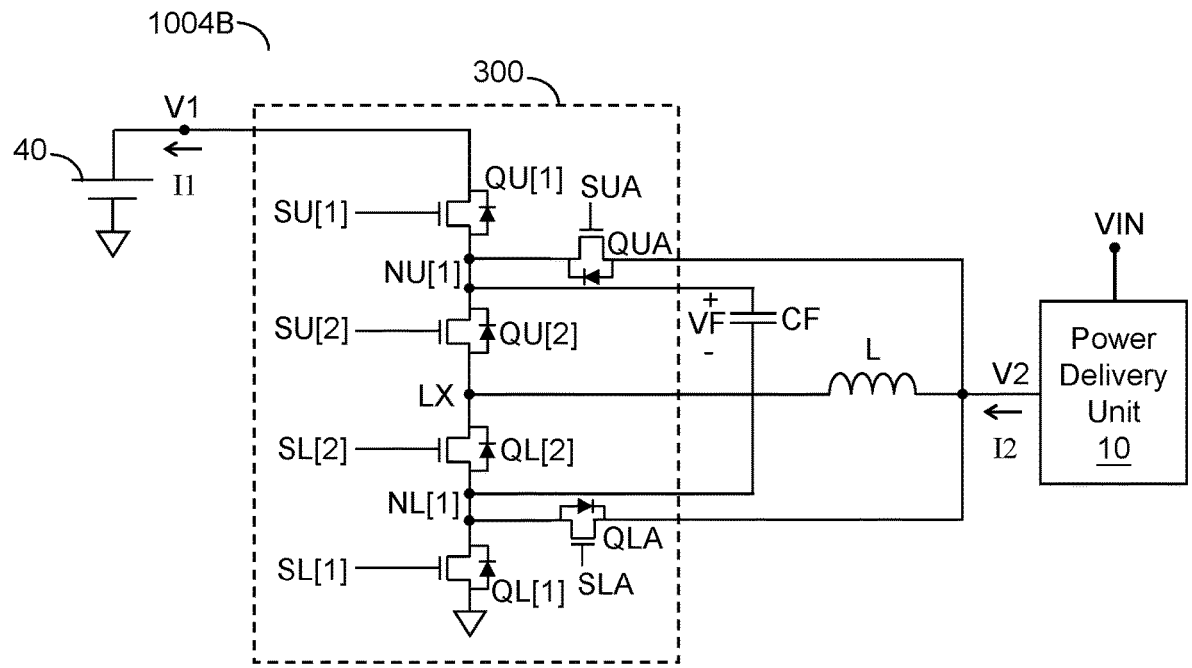

Please refer to FIG. 4B, which shows another specific embodiment of a charging system (i.e., charging system 1004B) of the present invention. The charging system 1004B of FIG. 4B is similar to the charging system 1004A of FIG. 4A, but is different in that: in the charging system 1004B of FIG. 4B, the second power corresponds to a DC power, whereas, the first power corresponds to a charging power. In other words, in this embodiment, the power conversion circuit 300 executes a voltage boost operation in the 3-level PWM mode or the power conversion circuit 300 executes a charge pumping (corresponding to current division) operation, so as to generate the first power for charging the battery 40. In one embodiment, the second current I2 generated by the power delivery unit 10 is constant, such that the first current I1 is constant, wherein the first current I1 is ½ times the level of the second current I2 (i.e., this situation is the so-called "current division"). In one embodiment, the second voltage V2 generated by the power delivery unit 10 is constant, such that the first voltage V1 is constant, wherein the first voltage V1 is 2 times the level of the second voltage V2 (i.e., this situation is the so-called "voltage boost").

Figure 4C:
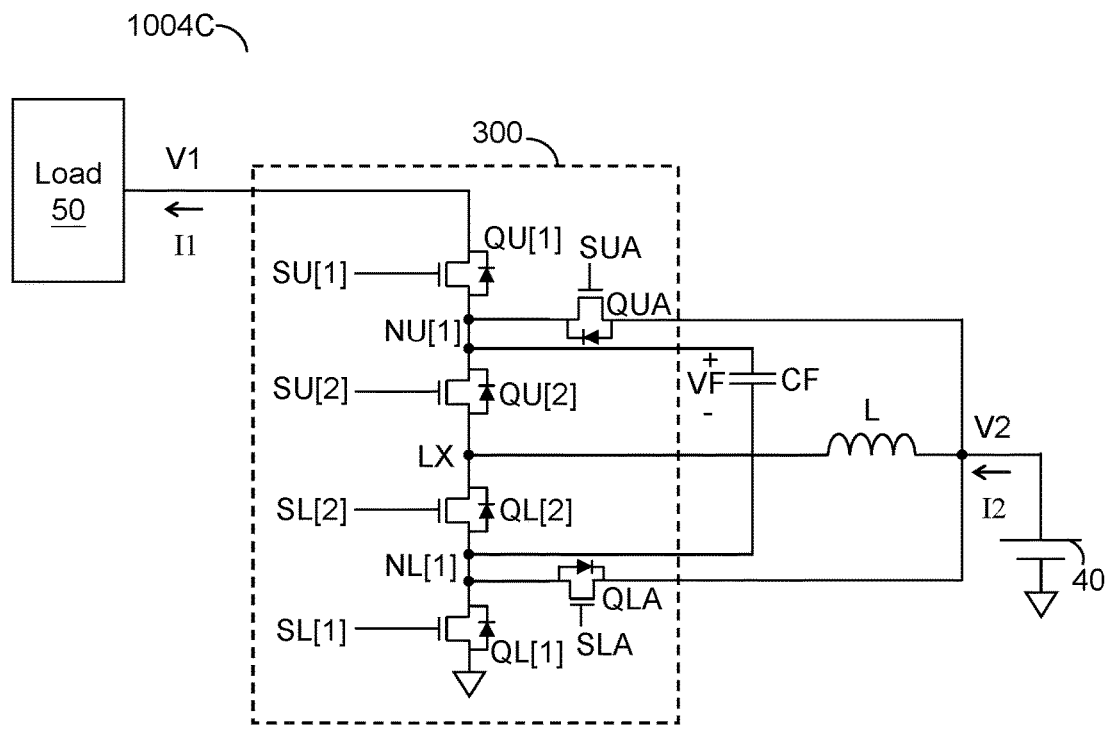
FIG. 4C show s specific embodiment of a power supply system of the present invention.

Please refer to FIG. 4C, which shows a specific embodiment of a power supply system (i.e., power supply system 1004C) of the present invention. The power supply system 1004C of FIG. 4C is similar to the charging system 1004B of FIG. 4B. In this embodiment, a battery 40 is configured to operably supply the second power. That is, the battery voltage corresponds to the second voltage V2, whereas, the battery current corresponds to the second current I2. The power conversion circuit 300 executes the voltage boost operation in the 3-level PWM mode or the power conversion circuit 300 executes a charge pumping (corresponding to current division) operation in the capacitive conversion mode, so as to convert the second power supplied from the battery 40 to the first power, and to thereby supply power to the load 50 via the first power. The power supply system 1004C corresponds to for example the battery power supply system complying with USB OTG specification. In one embodiment, the second voltage V2 generated by the battery 40 is constant, such that the first voltage V1 is constant, wherein the first voltage V1 is 2 times the level of the second voltage V2 (i.e., this situation is the so-called "voltage boost").

Figure 5:
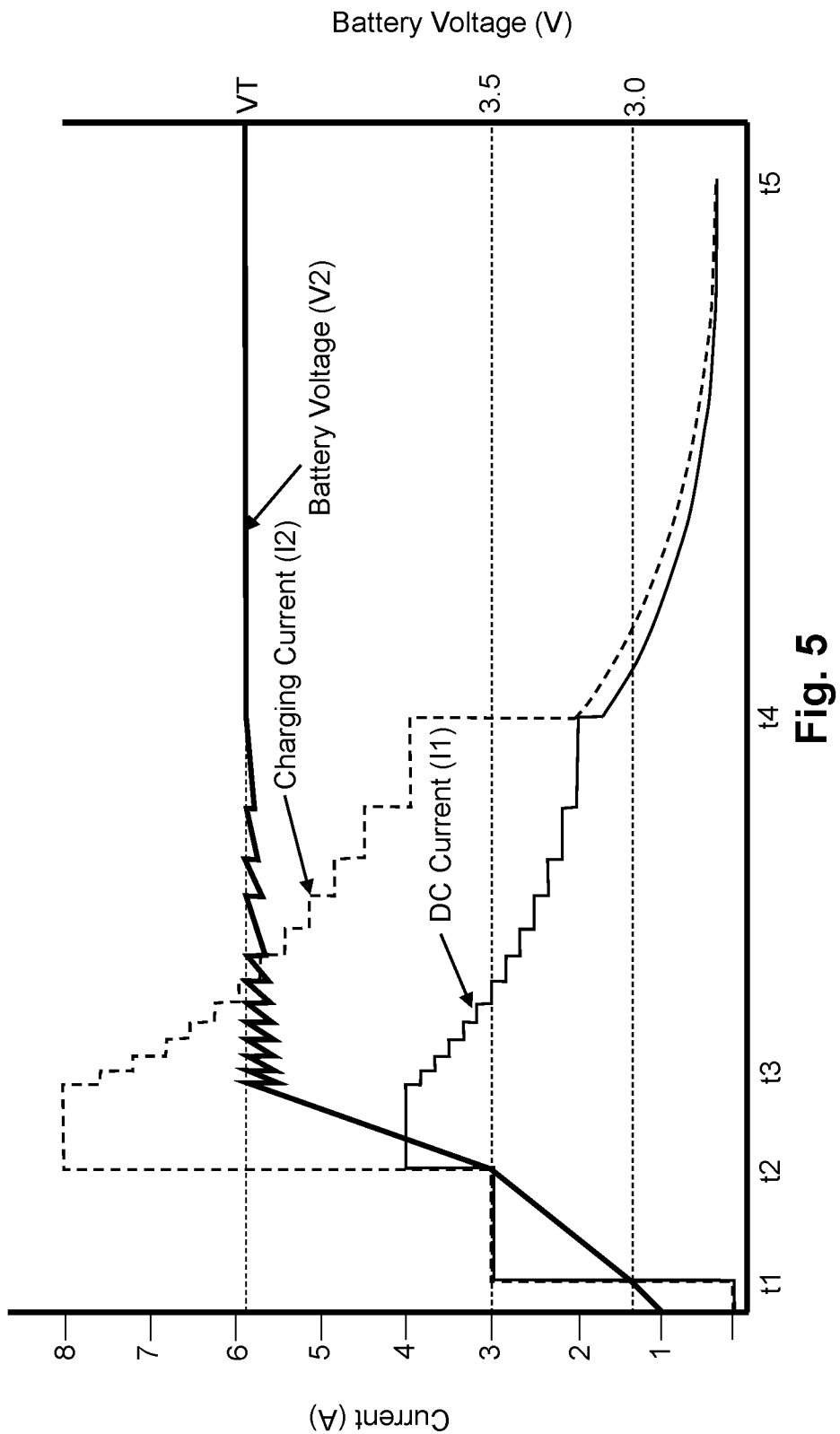
FIG. 5 illustrates a curve diagram depicting the charging operation of a charging system according to an embodiment of the present invention.

Please refer to FIG. 5, which illustrates a curve diagram depicting the charging operation of a charging system (e.g., charging system 1004A) according to an embodiment of the present invention. In FIG. 5, a thin solid line indicates a DC current (corresponding to the first current I1); a dashed line indicates a charging current (corresponding to the second current I2); a thick solid line indicates a battery voltage (corresponding to the second voltage V2). The power conversion circuit (e.g., power conversion circuit 300) of the present invention can support different demands at different stages during a charging process of a battery. As shown in FIG. 5, during a pre-charging stage (e.g., as shown by the period ranging from the time point t1 to the time point t2 in FIG. 5), the power conversion circuit 300 can operate in the 3-level PWM mode, so as to output a constant charging current having a relatively lower level (e.g., a current level smaller than 3 A), to charge the battery 40.

During a constant current charging stage (e.g., as shown by the period ranging from the time point t2 to the time point t4 in FIG. 5), the power conversion circuit 300 can operate in the capacitive conversion mode, so as to charge the battery 40 with a charging current having a relatively higher level (e.g., a current level ranging between 3 A to 8 A). More specifically, in this embodiment, the power conversion circuit 300 can output for example a constant charging current (i.e., I2) which is 2 times the level of a DC current (i.e., I1), to charge the battery 40. It is noteworthy that, during this period, in one embodiment, the DC current (i.e., I1) supplied from the power delivery unit 10 can be adaptively and gradually reduced as the battery voltage (i.e., V2) reaches a target voltage VT.

During a charging termination stage (e.g., as shown by the period ranging from the time point t4 to the time point t5 in FIG. 5), the power conversion circuit 300 can operate in the 3-level PWM mode, so as to output a constant charging voltage (i.e., V2) which is approximately equal to for example the target voltage VT, to charge the battery 40.

Figure 1:
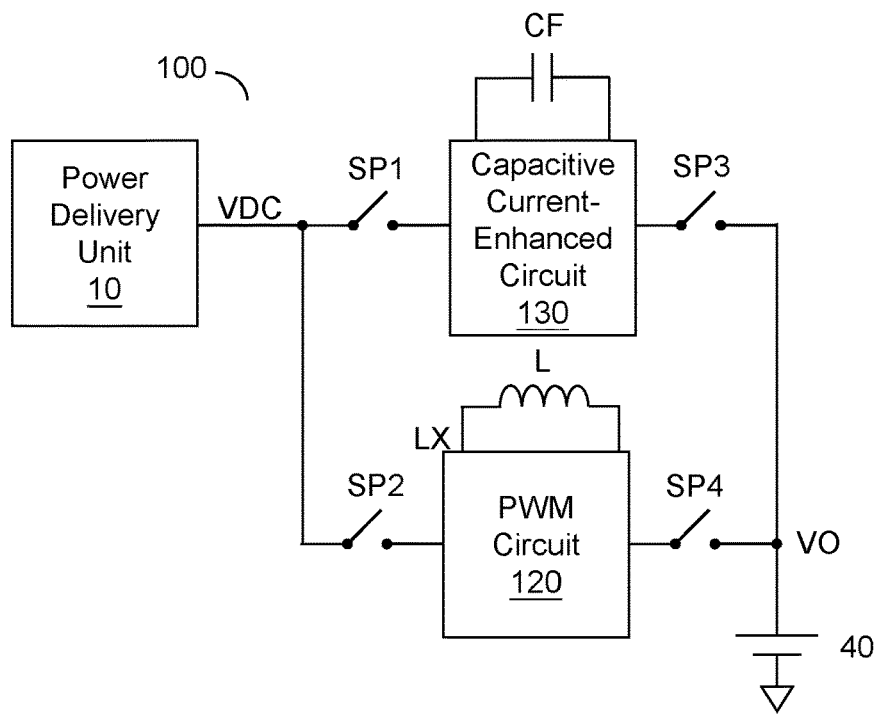
FIG. 1 shows a schematic circuit block diagram of a conventional charging system.
Figure 2:
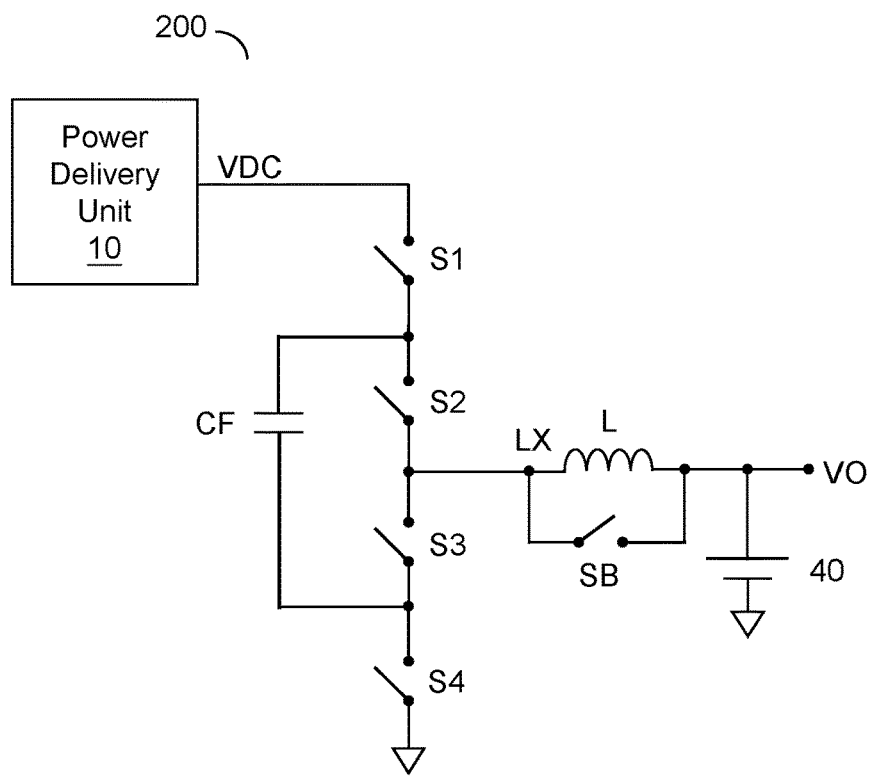
FIG. 2 shows a schematic circuit diagram of a conventional charging system.
Figure 6:
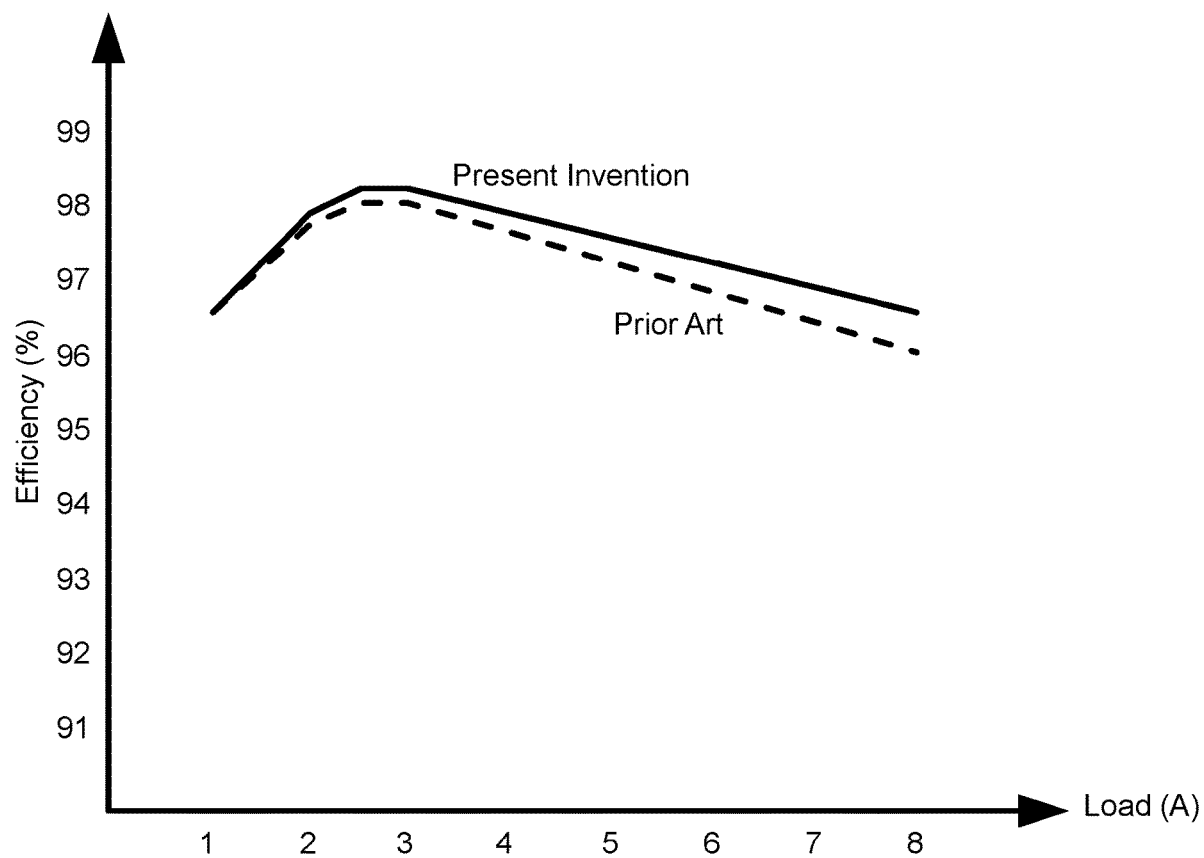
FIG. 6 illustrates efficiency curves depicting the efficiency of a power conversion circuit according to an embodiment of the present invention.

Please refer to FIG. 6, which illustrates efficiency curves depicting the efficiency of the power conversion circuit according to an embodiment of the present invention. FIG. 6 shows an efficiency comparison between the embodiments shown in FIG. 4A to FIG. 4C (as shown by a solid line in FIG. 6) and the prior art shown in FIG. 2 (as shown by a dashed line in FIG. 6). Referring to the dash curve in FIG. 6, in the prior art, to execute the capacitive conversion operation, the prior art short-circuits the inductor L via a bypass switch SB, but the conduction power loss through the bypass switch SB increases as the charging current (i.e., the load) increases, and the power conversion efficiency correspondingly decreases. As compared to the prior art shown in FIG. 2, it is not required for the present invention to employ any bypass switch SB. Instead, the present invention controls one end of the inductor L to be floating. As a result, as the comparison shows, when the current level is higher, the charging system and the power conversion circuit of the present invention have a better power conversion efficiency.

Figure 7:
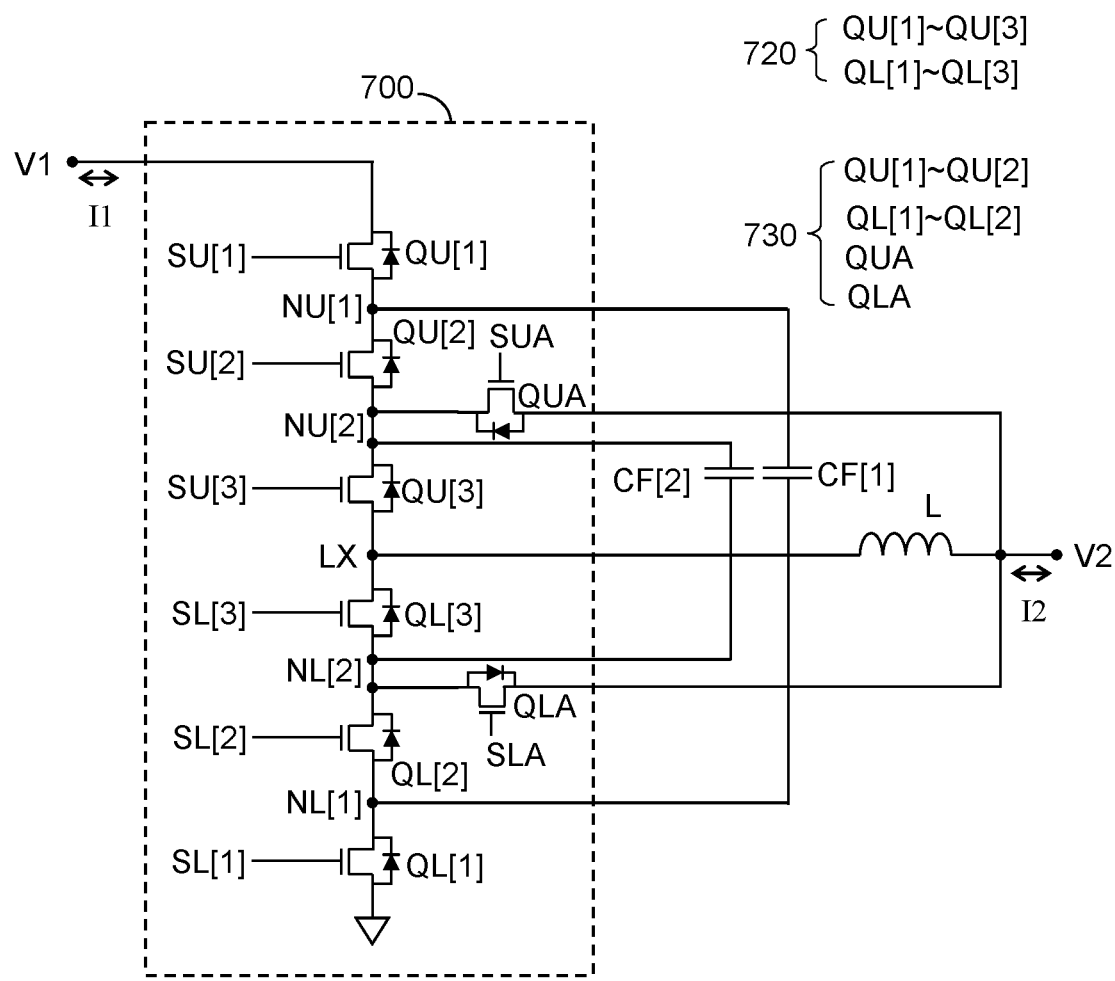
FIG. 7 shows a schematic diagram of a power conversion circuit according to another specific embodiment of the present invention.

Please refer to FIG. 7, which shows a schematic diagram of a power conversion circuit (i.e., power conversion circuit 700) according to another specific embodiment of the present invention. The power conversion circuit 700 comprises: a 4-level PWM power converter 720 and a switching capacitor power converter 730. The power conversion circuit 700 is similar to the above-mentioned power conversion circuit 300, but is different in that: the 4-level PWM power converter 720 and the switching capacitor power converter 730 include more switches, such as the upper gate switch QU[3] and the lower gate switch QL[3], for switching two capacitors CF[1] and CF[2] of the power conversion circuit 700, whereby the power conversion circuit 700 can execute 4-level PWM switching and execute capacitive power conversion resulting in 3-fold voltage or 3-fold current.

More specifically, in this embodiment, the 4-level PWM power converter 720 and the switching capacitor power converter 730 share upper gate switches QU[1]~QU[2] and lower gate switches QL[1]~QL[2]. Besides, an upper gate auxiliary sub-switch QUA is coupled between the second power and the upper gate central node NU[2], whereas, a lower gate auxiliary sub-switch QUL is coupled between the second power and the lower gate central node NL[2]. The capacitor CF[1] is coupled between the upper gate central node NU[1] and the lower gate central node NL[1]. The capacitor CF[2] is coupled between the upper gate central node NU[2] and the lower gate central node NL[2]. The above-mentioned upper gate switches are controlled by control signals SU[1]~SU[3], whereas, the above-mentioned lower gate switches are controlled by control signals SL[1]~SL[3], whereas, the above-mentioned auxiliary sub-switches QUA and QLA are controlled by control signals SUA and SLA, respectively.

In one embodiment, in a 4-level PWM mode, a voltage at the switching node LX is periodically switched among four different voltage levels: the first voltage V1, the ground, ⅔-fold of the first voltage V1, and ⅓-fold of the first voltage V1, thereby achieving 4-level PWM switching. Besides, in a capacitive conversion mode, the power conversion circuit 700 can switch the above-mentioned shared switches and auxiliary sub-switches by capacitive voltage division or by charge pumping operation, so as to generate 3-fold voltage or 3-fold current. In one embodiment, in a steady state during periodical switching, the voltage across the capacitor CF[1] is equal to ⅔-fold of the first voltage V1, whereas, the voltage across the capacitor CF[2] is equal to ⅓-fold of the first voltage V1.

The power conversion circuit 700 of this embodiment is similar to the power conversion circuit 300 of previous embodiment in that: in the 4-level PWM mode, the upper gate auxiliary sub-switch QUA and the lower gate auxiliary sub-switch QLA are both always OFF, such that the capacitors CF[1] and CF[2] are always electrically disconnected from the second power. Besides, in the capacitive conversion mode, the third upper gate switch QU[3] and the third lower gate switch QL[3] are always OFF, such that the switching node LX is open. That is, one end of the inductor L which is coupled to the switching node LX is floating.

Figure 8:
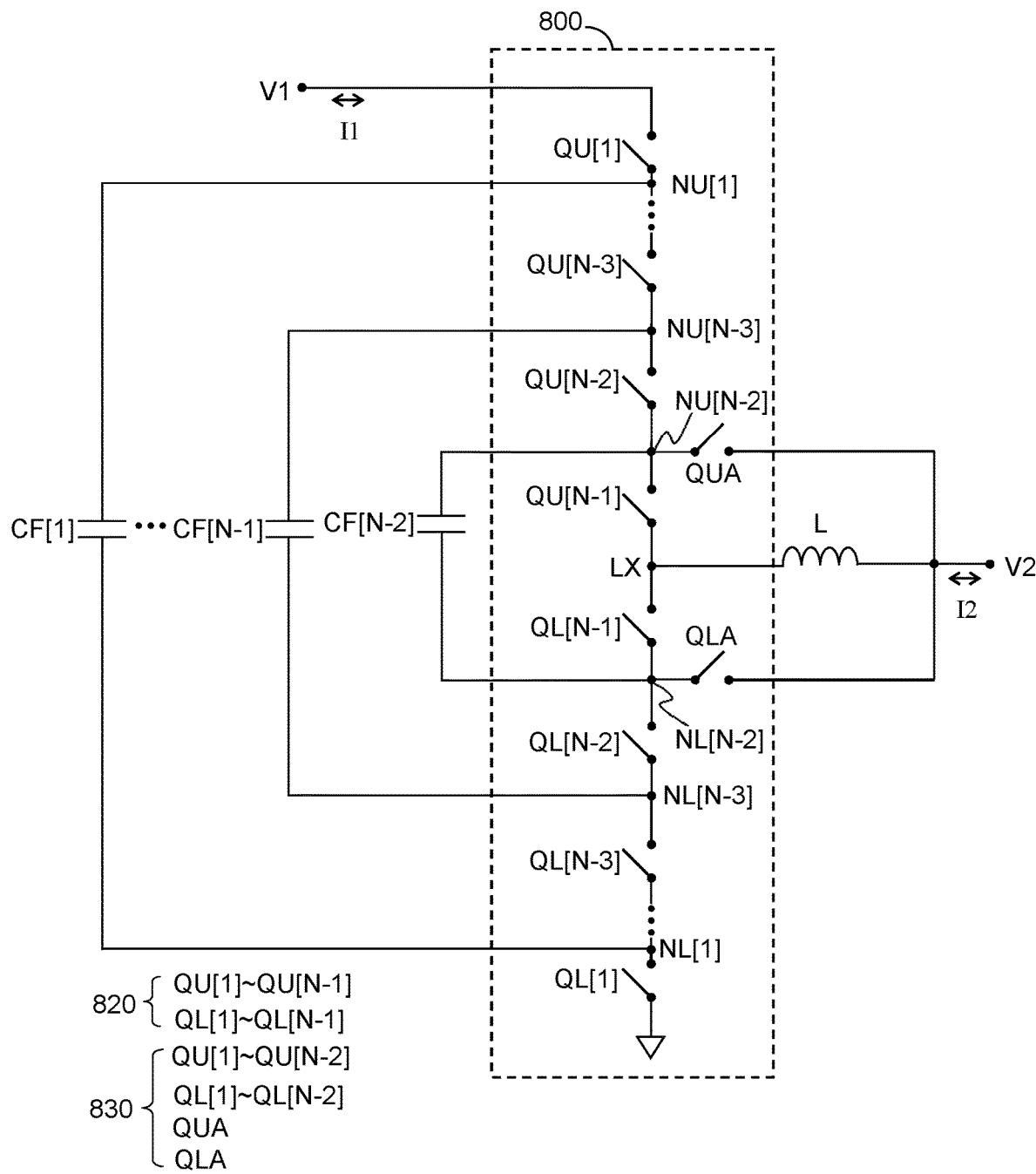
FIG. 8 shows a schematic diagram of a power conversion circuit according to yet another specific embodiment of the present invention.

Please refer to FIG. 8, which shows a schematic diagram of a power conversion circuit (i.e., power conversion circuit 800) according to yet another specific embodiment of the present invention. The present invention can be applied to a broader application according to the general principle derived from the previous embodiments. That is, the power conversion circuit 800 comprises an N-level PWM power converter 820 and a switching capacitor power converter 830. The N-level PWM power converter 820 includes: upper gate switches QU[1]~QU[N−1] coupled in series between the first power and a switching node LX, and lower gate switches QL[1]~QL[N−1] coupled in series between the switching node LX and a ground node, wherein adjacent upper gate switches QU[1]~QU[N−1] are coupled to a corresponding upper gate central node NU[1]~NU[N−2] in between, and adjacent lower gate switches QL[1]~QL[N−1] are coupled to a corresponding lower gate central node NL[1]~NL[N−2] in between.

The switching capacitor power converter 830 includes: an upper gate auxiliary sub-switch QUA and a lower gate auxiliary sub-switch QLA, and upper gate switches QU[1]~QU[N−2] and lower gate switches QL[1]~QL[N−2] which are switches shared with the N-level PWM power converter 820. The upper gate auxiliary sub-switch QUA has a first end coupled to the second power and a second end coupled to the corresponding upper gate central node NU[N−2]. The lower gate auxiliary sub-switch QLA has a first end coupled to the second power and a second end coupled to the corresponding lower gate central node NL[N−2].

Please still refer to FIG. 8. The inductor L is coupled between the switching node LX and the second power. Each capacitor CF[1]~CF[N−2] has a first end coupled to a corresponding upper gate central node NU[1]~NU[N−2] and a second end coupled to a corresponding lower gate central node NL[1]~NL[N−2].

In an N-level PWM mode, the upper gate switches QU[1]~QU[N−1] and the lower gate switches QL[1]~QL[N−1] periodically switch the capacitor CF, so as to generate an N-level voltage at the switching node LX, so that the inductor L executes power conversion between the first power and the second power by N-level PWM switching. The N-level voltage includes: the first voltage V1, the ground voltage, and (N−2) voltages whose levels range between the first voltage V1 and the ground voltage, wherein N is an integer greater than or equal to three.

In the capacitive conversion mode, the upper gate auxiliary sub-switch QUA, the upper gate switches QU[1]-QU[N−2], the lower gate auxiliary sub-switch QLA and the lower gate switches QL[1]-QL[N−2] periodically switch the coupling relationships of the capacitors CF[1]~CF[N−2], so that the capacitors CF[1]~CF[N−2] convert the first power to the second power by capacitive voltage division or so that capacitors CF[1]~CF[N−2] convert the second power to the first power by charge pumping operation.

In one embodiment, in the capacitive conversion mode, the first voltage V1 of the first power is M times the level of the second voltage V2 of the second power, wherein M is a real number greater than one. In one preferable embodiment, M is a positive integer greater than one.

The power conversion circuit 800 of this embodiment is similar to the power conversion circuit 300 of the previous embodiments in that: in the N-level PWM mode, the upper gate auxiliary sub-switch QUA and the lower gate auxiliary sub-switch QLA are both always OFF, such that the capacitor CF is always electrically disconnected from the second power. Besides, in the capacitive conversion mode, the upper gate switch QU[N−1] and the lower gate switch QL[N−1] are always OFF, such that the switching node LX is open. That is, one end of the inductor L which is coupled to the switching node LX is floating.

It is worthwhile noting that, in another embodiment, the second end of the upper gate auxiliary sub-switch QUA can be coupled to another upper gate central node NU[i], wherein i is an integer ranging from 1 to N−2, whereas, the second end of the lower gate auxiliary sub-switch QLA can be the coupled to another lower gate central node NL[i]. As a result, in the capacitive conversion mode, the power conversion circuit 800 can execute capacitive power conversion by a less number of capacitors. Under such situation, the number of the upper gate switches and the number of the lower gate switches shared by the N-level PWM power converter 820 and the switching capacitor power converter 830 will be accordingly reduced. From one perspective, in the capacitive conversion mode, at least one of the upper gate switches which is not one of the shared switches is always OFF, and at least one of the lower gate switches which is not one of the shared switches is always OFF, such that one end of the inductor L which is coupled to the switching node LX is floating.

Figure 9A:
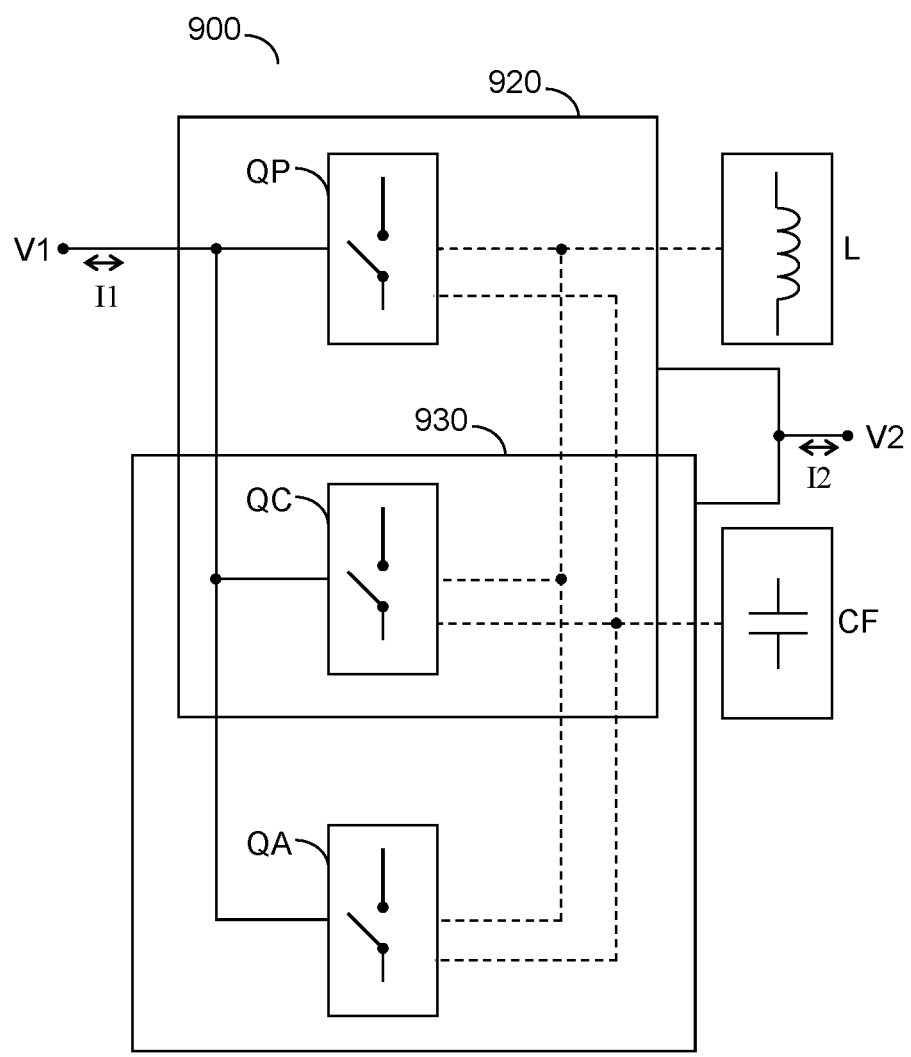
FIG. 9A shows a schematic block diagram of a power conversion circuit according to an embodiment of the present invention.

Please refer to FIG. 9A, which shows a schematic block diagram of a power conversion circuit according to an embodiment of the present invention. This embodiment is a more general expression of the present invention, according to the spirit shown by the previous embodiments in FIG. 3, FIG. 7 and FIG. 8.

As shown in FIG. 9A, the power conversion circuit 900 is configured to operably convert the first power to the second power or convert the second power to the first power. The power conversion circuit 900 comprises: an N-level PWM power converter 920 and a switching capacitor power converter 930.

The N-level PWM power converter 920 is configured to operably switch an inductor L and at least one capacitor (e.g., CF) in an N-level PWM mode, so as to execute power conversion between the first power and the second power. The switching capacitor power converter 930 is configured to operably switch the capacitor CF in a capacitive conversion mode, so as to execute power conversion between the first power and the second power.

In one embodiment, the N-level PWM power converter 920 includes: shared switches QC shared with the switching capacitor power converter 930 and PWM switches QP. In the N-level PWM mode, the shared switches QC and the PWM switches QP periodically switch the inductor L and the capacitor CF, so as to execute power conversion between the first power and the second power by N-level PWM switching operation, wherein N is an integer greater than or equal to three.

In one embodiment, the switching capacitor power converter 930 includes: the shared switches QC and auxiliary switches QA. In the capacitive conversion mode, the shared switches QC and the auxiliary switches QA periodically switch the capacitor CF, so as to execute power conversion between the first power and the second power by capacitive power conversion operation.

The shared switches QC shown in FIG. 9A correspond to for example the upper gate switch QU[1] and the lower gate switch QL[1] shown in FIG. 3, or correspond to for example the upper gate switches QU[1]~QU[2] and the lower gate switches QL[1]~QL[2] shown in FIG. 7, or correspond to for example the upper gate switches QU[1]~QU[N−2] and the lower gate switches QL[1]~QL[N−2] shown in FIG. 8. The above-mentioned upper gate switches which serve as the shared switches QC correspond to upper gate shared sub-switches, whereas, the above-mentioned lower gate switches which serve as the shared switches QC correspond to lower gate shared sub-switches.

Besides, the PWM switches QP shown in FIG. 9A correspond to for example the upper gate switch QU[2] and the lower gate switch QL[2] shown in FIG. 3, or correspond to for example the upper gate switches QU[3] and the lower gate switches QL[3] shown in FIG. 7, or correspond to for example the upper gate switches QU[N−1] and the lower gate switches QL[N−1] shown in FIG. 8. In other words, the PWM switches QP correspond to non-shared switches in the N-level PWM power converter 920.

Moreover, auxiliary switches QA shown in FIG. 9A correspond to the upper gate auxiliary sub-switch QUA and the lower gate auxiliary sub-switch QLA shown in FIG. 3, FIG. 7 and FIG. 8.

In one embodiment, in the capacitive conversion mode, the first voltage V1 of the first power is M times the level of the second voltage V2 of the second power. In one embodiment, by proper configuration of capacitors and switches, M is a real number greater than one. In one embodiment, M is an integer greater than one.

Figure 9B:
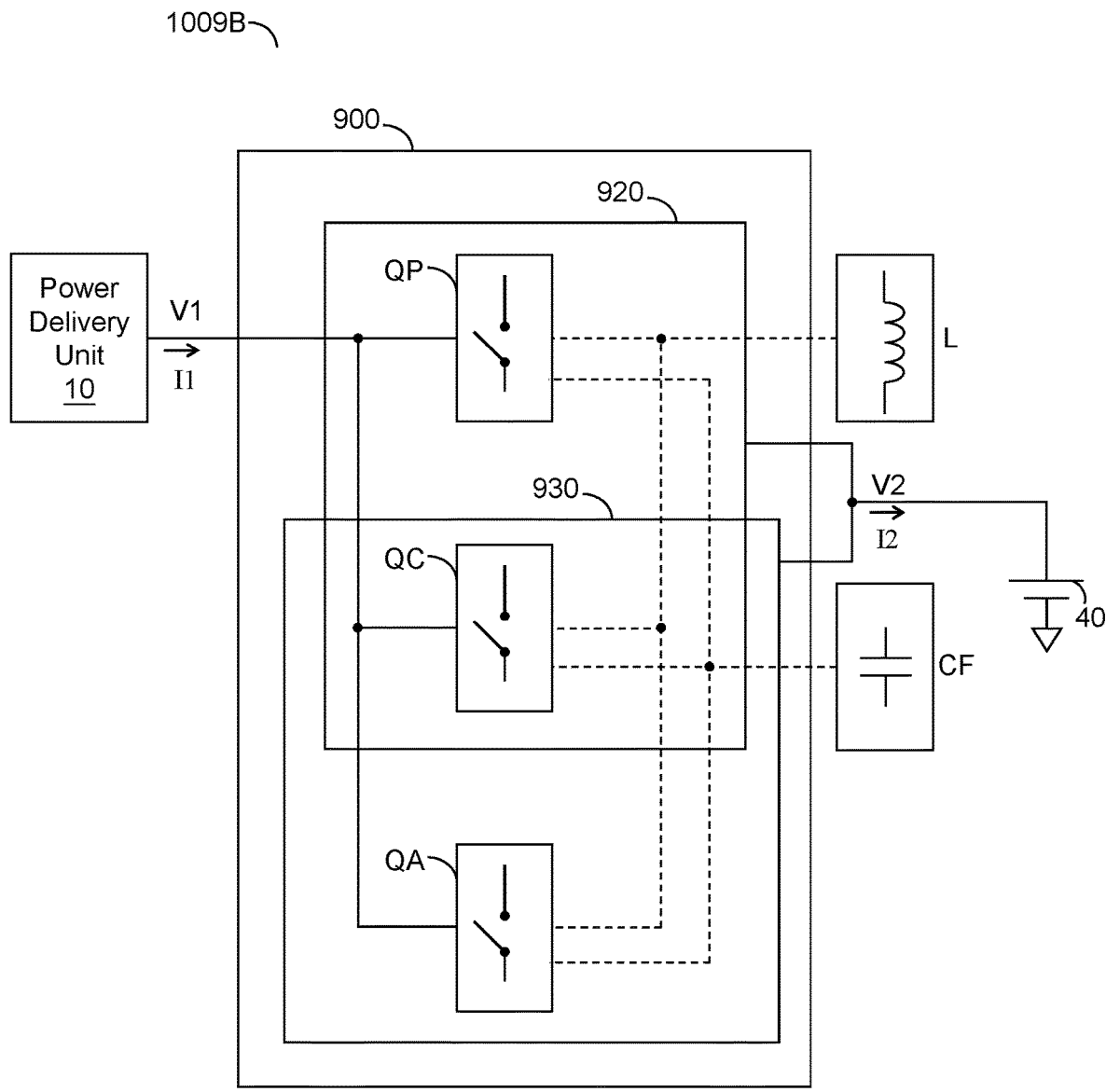
FIG. 9B shows a schematic diagram of a charging system according to a specific embodiment of the present invention.

Please refer to FIG. 9B, which shows a schematic diagram of a charging system according to a specific embodiment of the present invention. Similar to the charging system 1004A of the embodiment shown in FIG. 4A and the charging system 1004B of the embodiment shown in FIG. 4B, in this embodiment, the power delivery unit 10 is configured to operably generate the first power. The power conversion circuit 900 is configured to operably convert the first power to the second power. In one embodiment, the power delivery unit 10 controls the first current I1 of the first power to be constant, wherein in a capacitive conversion mode, the second current I2 of the second power generated by the power conversion circuit 900 is also constant. Besides, the second current I2 is M times the level of the first current I1.

In one embodiment, in a capacitive conversion mode, at least a portion of PWM switches QP (referring to the previous embodiment shown in FIG. 9A) are always OFF, so that one end of the inductor L is floating.

In one embodiment, in an N-level PWM mode, auxiliary switches QA (e.g., corresponding to the upper gate auxiliary sub-switch QUA and the lower gate auxiliary sub-switch QLA shown in FIG. 3, FIG. 7 and FIG. 8) are always OFF, such that the capacitor CF is always electrically disconnected from the second power.

In one embodiment, in the N-level PWM mode, a ratio of the first voltage V1 of the first power to the second voltage V2 of the second power is correlated with a duty ratio corresponding to the N-level voltage. In one embodiment, the N-level voltage includes the first voltage V1, a ground voltage, and (N−2) voltages whose levels range between the first voltage V1 and the ground voltage.

In one embodiment, M is an integer and M is equal to N minus one.

Figure 10:
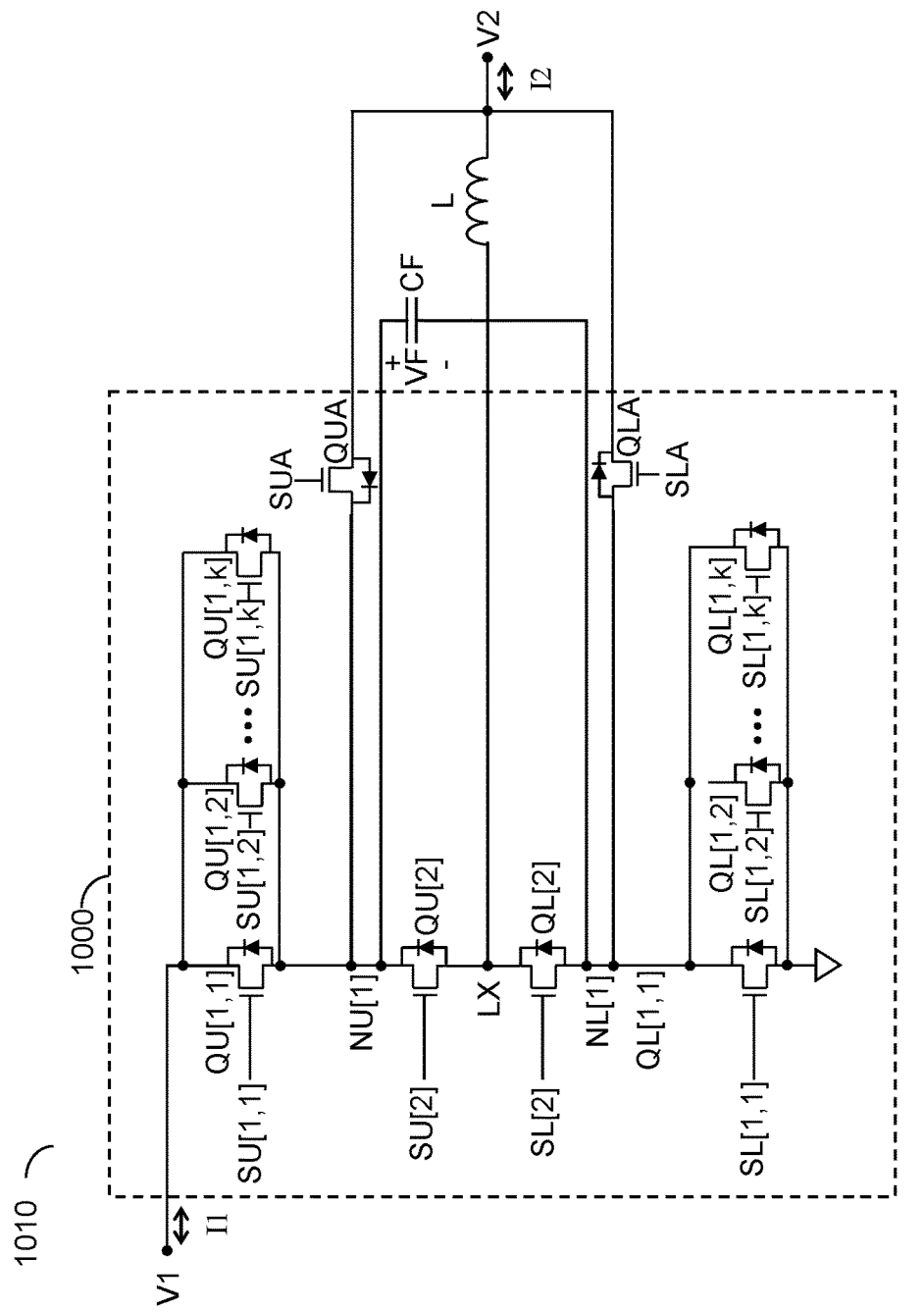
FIG. 10 shows a schematic diagram of a power conversion circuit according to still another specific embodiment of the present invention.

Please refer to FIG. 10, which shows a schematic diagram of a charging system (i.e. charging system 1010) and a power conversion circuit (i.e., power conversion circuit 1000) according to still another specific embodiment of the present invention. Please refer to FIG. 11, which illustrates a signal waveform diagram depicting the operation of the charging system 1010 according to an embodiment of the present invention. The power conversion circuit 1000 of FIG. 10 is similar to the power conversion circuit 300 of FIG. 3, but is different in that: in one embodiment, the upper gate switch QU[1] (i.e., upper gate shared sub-switch) includes: upper gate shared sub-switches QU[1, 1], QU[1, 2] ... QU[1, k] coupled in parallel to one another. In one embodiment, the lower gate switch QL[1] (i.e., lower gate shared sub-switch) includes: lower gate shared sub-switches QL[1, 1], QL[1, 2] ... QL[1, k] coupled in parallel to one another, wherein k is an integer greater than one.

Figure 11:
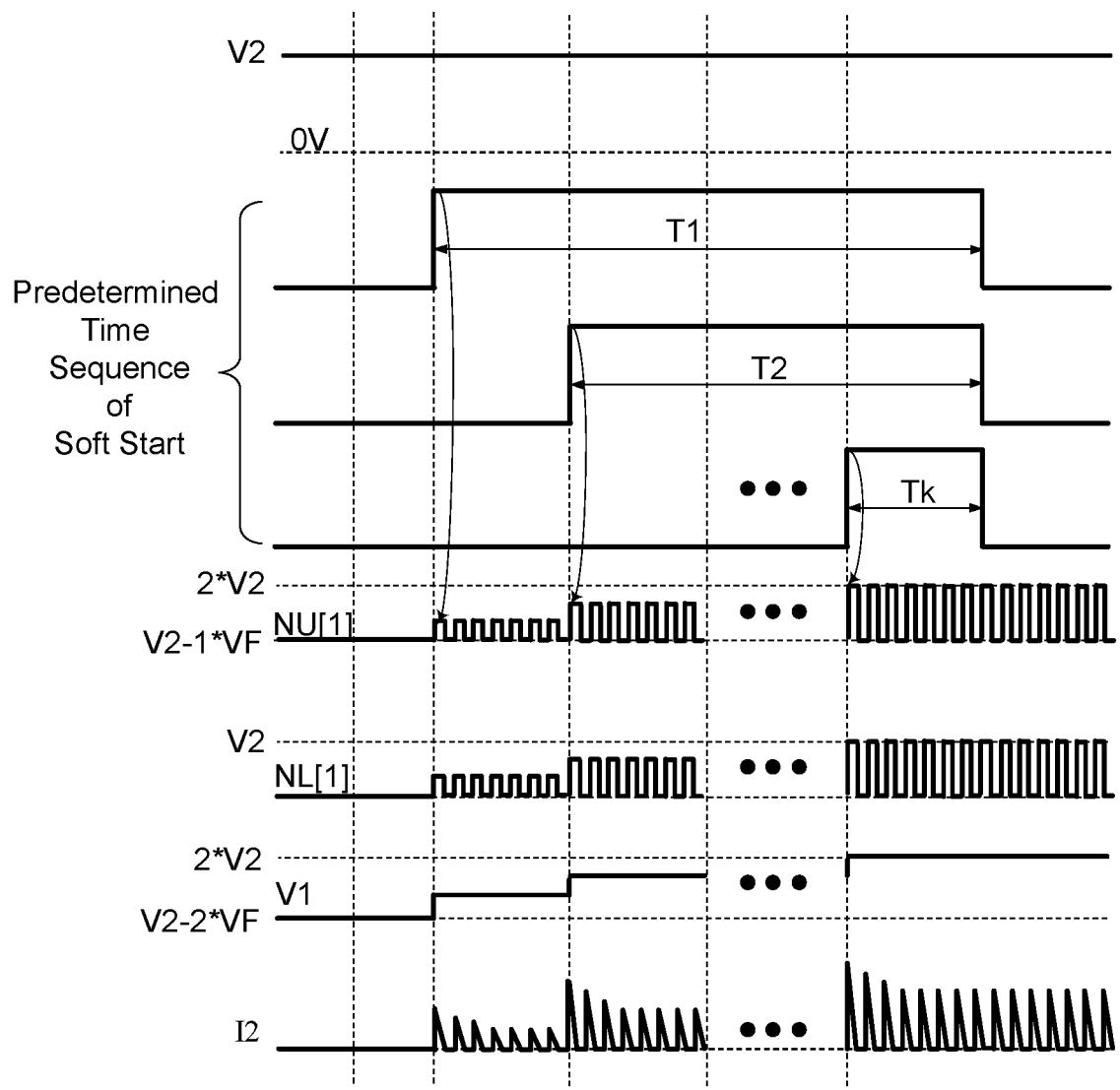
FIG. 11 illustrates a signal waveform diagram depicting the operation of a charging system according to an embodiment of the present invention.

According to the above-mentioned configuration, in one embodiment, in a capacitive conversion mode, during a soft start period, the upper gate shared sub-switches QU[1, 1], QU[1, 2] ... QU[1, k] are sequentially turned ON according to a predetermined time sequence and/or the lower gate shared sub-switches QL[1, 1], QL[1, 2] ... QL[1, k] are sequentially turned ON according to a predetermined time sequence, to reduce a surge current which might occur during the soft start period. The above-mentioned predetermined time sequence for example can be as illustrated in FIG. 11. This embodiment corresponds to an operation to convert the second power to the first power. As shown in FIG. 11, in a case where a difference between a voltage VF across the capacitor CF and a steady state voltage thereof is large (e.g., during a soft start period), this embodiment performs 3-level PWM switching and/or capacitive power conversion by turning ON a less number of upper gate shared sub-switches and/or a less number of lower gate shared sub-switches, so as to effectively reduce the surge current.

More specifically, in this embodiment of FIG. 11, the power conversion circuit 1000 is configured to operably convert the second power to the first power. That is, the power conversion circuit 1000 executes a voltage boost operation in the 3-level PWM mode or executes a charge pumping operation in a capacitive conversion mode. In one embodiment, the turned-ON number of the above-mentioned upper gate shared sub-switches QU[1, 1], QU[1, 2] . . . QU[1, k] and/or the turned-ON number of the above-mentioned lower gate shared sub-switches QL[1, 1], QL[1, 2] . . . QL[1, k] are gradually increased in an order according to the period T1, the period T2, . . . the period Tk, thereby effectively reducing the surge current in the input current (corresponding to the second current). More specifically, within the period T1 and at a rising edge of the period T2, only the upper gate shared sub-switches QU[1, 1] and/or the lower gate shared sub-switches QL[1, 1] participate in executing the 3-level PWM switching (i.e., turned-ON in switching fashion), while in the meantime, the rest of upper gate shared sub-switches QU[1, 2] . . . QU[1, k] and the rest of lower gate shared sub-switches QL[1, 2] . . . QL[1, k] are always OFF and they start participating in executing the 3-level PWM switching only until their respective corresponding periods.

Besides, in a case where the power conversion circuit 1000 executes a buck conversion operation in the 3-level PWM mode or executes a capacitive voltage division (corresponding to current multiplication) operation in the capacitive conversion mode, the power conversion circuit 1000 also can adopt the above-mentioned soft start operation. More specifically, in a case where the upper gate shared sub-switches QU[1, 1], QU[1, 2] . . . QU[1, k] have an identical ON resistance, the surge current can be represented as dVQU[1]/(R_Q[1]*k/j), wherein dVQU[1] is a voltage between the drain and source of the upper gate switch QU[1], R_Q[1] denotes an equivalent resistance where the upper gate shared sub-switches QU[1, 1], QU[1, 2] . . . QU[1, k] are all ON, j denotes a number of the upper gate shared sub-switches QU[1, 1], QU[1, 2] . . . QU[1, k] that are ON simultaneously.

Figure 12:
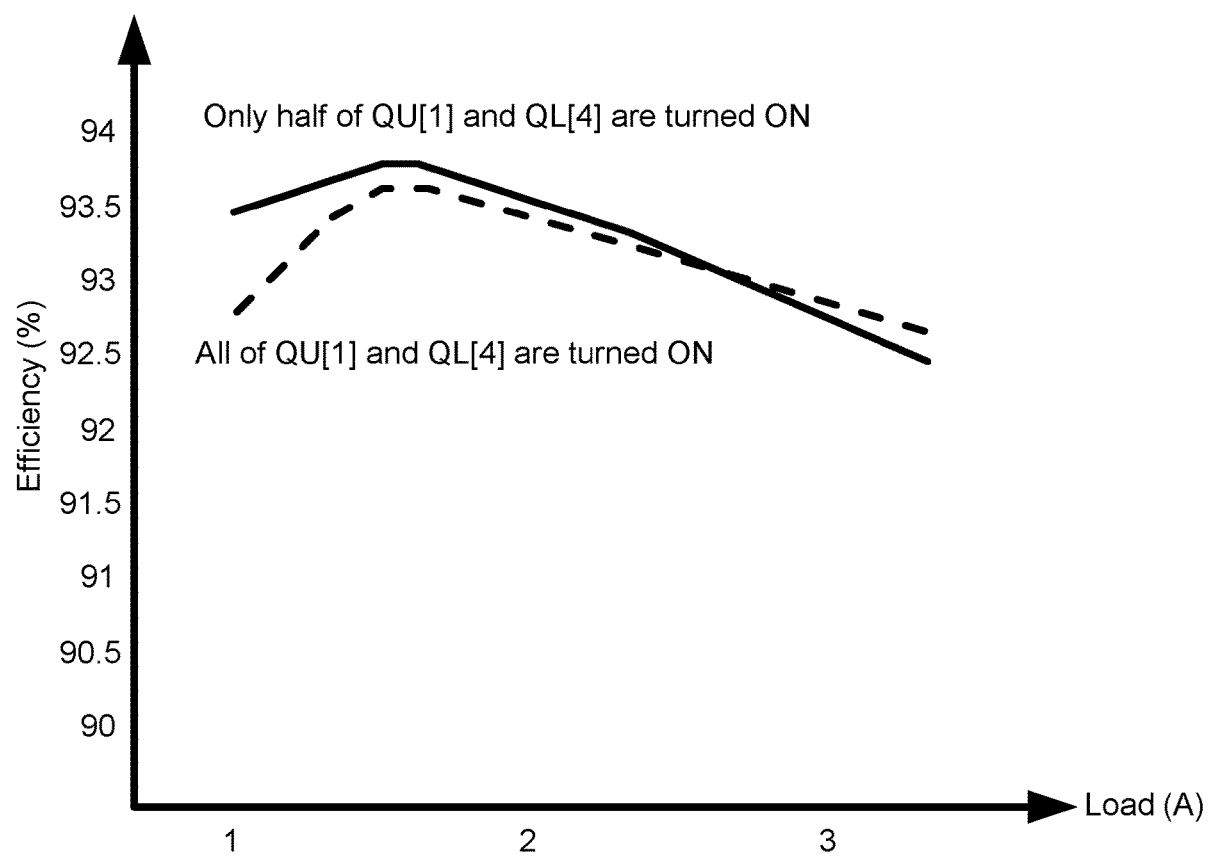
FIG. 12 illustrates efficiency curves depicting the efficiency of a power conversion circuit according to another embodiment of the present invention.

Please refer to FIG. 12, which illustrates efficiency curves depicting the efficiency of a power conversion circuit of the embodiment shown in FIG. 10. The total conversion power loss includes ON (conduction) power loss and switching power loss. As shown in FIG. 12, in a case where a 3-level PWM switching is executed through turning ON a less number of upper gate shared sub-switches (e.g., only half of the upper gate shared sub-switches are turned ON) and/or a less number of lower gate shared sub-switches (e.g., only half of the lower gate shared sub-switches are turned ON) (as shown by a solid line in FIG. 12), because the current is relatively lower, the switching power loss is relatively lower and the ON power loss is also relatively lower, this embodiment has a relatively higher efficiency than in the case of prior art 3-level PWM switching (as shown by a dashed line in FIG. 12).

Certainly, it should be understood that to partition the upper gate switch QU[1] or the lower gate switch QL[1] as k shared sub-switches in the above-mentioned preferred embodiment is only an illustrative example, but not for limiting the broadest scope of the present invention. In other embodiments, it is also practicable and within the scope of the present invention that any one of the upper gate switch QU[2]~QU[N−1] or any one of the lower gate switch QL[2]~QL[N−1] can be partitioned in a similar way.

From one perspective, in the above description, when describing "turning ON the upper gate switch QU[1]", means at least one of the upper gate shared sub-switches QU[1, 1], QU[1, 2] . . . QU[1, k] is turned ON, and "turning OFF the lower gate switch QU[1]", means all of the upper gate shared sub-switches QU[1, 1], QU[1, 2] . . . QU[1, k] are turned OFF. The same principle also applies to the lower gate switch. Taking FIG. 11 as an example, within the period T1 or the period T2, the upper gate switches QU[1]~QU[N−1] periodically switch the capacitor CF and/or the inductor L as described in the previous embodiments; However, within the period T1, when it is required to turn ON the upper gate switch QU[1], only the upper gate shared sub-switch QU[1, 1] is turned ON; within the period T2, when it is required to turn ON the upper gate switch QU[1], only the upper gate shared sub-switches QU[1, 1] and QU[1, 2] are turned ON, and so on.

The present invention provides a power conversion circuit and a charging system which include an N-level PWM power converter and a switching capacitor power converter, wherein the N-level PWM power converter and the switching capacitor power converter share part of switches. Under such implementation, the present invention can adaptively and flexibly select an operation mode among multiple combinations of the N-level PWM conversion mode and the capacitive conversion mode, to execute power conversion to charge a battery or to supply power from the battery by maximum power or optimum efficiency.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power conversion circuit, which is configured to operably convert a first power to a second power or convert the second power to the first power; the power conversion circuit comprising:
an N-level PWM power converter, which is configured to operably switch an inductor and at least one capacitor in an N-level PWM mode, so as to execute power conversion between the first power and the second power; and a switching capacitor power converter, which is configured to operably switch the at least one capacitor in a capacitive conversion mode, so as to execute power conversion between the first power and the second power;

wherein the N-level PWM power converter includes:
 a plurality of shared switches shared with the switching capacitor power converter; and
 a plurality of PWM switches, wherein in the N-level PWM mode, the plurality of shared switches and the plurality of PWM switches periodically switch the inductor and the at least one capacitor, so as to execute power conversion between the first power and the second power by N-level PWM switching operation, wherein N is an integer greater than or equal to three;

wherein the switching capacitor power converter includes:
 the plurality of shared switches; and
 a plurality of auxiliary switches, wherein in the capacitive conversion mode, the plurality of shared switches and the plurality of auxiliary switches periodically switch the at least one capacitor, so as to execute power conversion between the first power and the second power by capacitive power conversion operation;
 wherein in the capacitive conversion mode, a portion of the plurality of PWM switches are always OFF, such that one end of the inductor is floating;

wherein in the N-level PWM mode, the plurality of auxiliary switches are always OFF, such that the at least one capacitor is always electrically disconnected from one of the first power and the second power;

wherein the N-level PWM power converter includes:
 a plurality of upper gate switches coupled in series between the first power and a switching node, wherein adjacent upper gate switches are coupled to a corresponding upper gate central node in between; and
 a plurality of lower gate switches coupled in series between the switching node and a ground node, wherein adjacent lower gate switches are coupled to a corresponding lower gate central node in between;

wherein the switching capacitor power converter includes:
 a portion of the plurality of upper gate switches;
 a portion of the plurality of lower gate switches, wherein the portion of the plurality of upper gate switches and the portion of the plurality of lower gate switches are the plurality of shared switches;
 an upper gate auxiliary sub-switch having a first end coupled to the second power and having a second end coupled to a corresponding one of the upper gate central nodes; and
 a lower gate auxiliary sub-switch having a first end coupled to the second power and having a second end coupled to a corresponding one of the lower gate central nodes, wherein the upper gate auxiliary sub-switch and the lower gate auxiliary sub-switch are the plurality of auxiliary switches;

wherein the inductor is coupled between the switching node and the second power;

wherein the at least one capacitor has a first end coupled to a corresponding one of the upper gate central nodes and has a second end coupled to a corresponding one of the lower gate central nodes;

wherein in the N-level PWM mode, the plurality of upper gate switches and the plurality of lower gate switches periodically switch the at least one capacitor, so as to generate an N-level voltage at the switching node, so that the inductor executes power conversion between the first power and the second power by N-level PWM switching operation;

wherein in the capacitive conversion mode, the upper gate auxiliary sub-switch, the lower gate auxiliary sub-switch and the plurality of shared switches periodically switch the at least one capacitor, so that the at least one capacitor converts the first power to the second power by capacitive voltage division or so that the at least one capacitor converts the second power to the first power by charge pumping operation.

2. The power conversion circuit of claim 1, wherein in the N-level PWM mode, the upper gate auxiliary sub-switch and the lower gate auxiliary sub-switch are both always OFF, such that the at least one capacitor is always electrically disconnected from the second power.

3. The power conversion circuit of claim 1, wherein in the capacitive conversion mode, at least one of the plurality of upper gate switches which is not the plurality of shared switches is always OFF and at least one of the plurality of lower gate switches which is not the plurality of shared switches is always OFF, such that one end of the inductor which is coupled to the switching node is floating.

4. The power conversion circuit of claim 1, wherein in the N-level PWM mode, a ratio of a first voltage of the first power to a second voltage of the second power is correlated with a duty ratio corresponding to the N-level voltage.

5. The power conversion circuit of claim 1, wherein in the capacitive conversion mode, a ratio of a first voltage of the first power to a second voltage of the second power is equal to M, wherein M is a real number greater than one.

6. The power conversion circuit of claim 5, wherein M is equal to N minus one.

7. The power conversion circuit of claim 5, wherein when the power conversion circuit is configured to operably convert the first power to the second power, in the capacitive conversion mode, a first current of the first power is constant, such that a second current of the second power is constant, wherein the second current is M times the level of the first current.

8. The power conversion circuit of claim 5, wherein in the capacitive conversion mode:
 an upper gate switch of the plurality of shared switches includes: a plurality of upper gate shared sub-switches connected in parallel with one another, wherein during a soft start period, the plurality of upper gate shared sub-switches are sequentially turned ON according to a predetermined time sequence; and/or
 a lower gate switch of the plurality of shared switches includes: a plurality of lower gate shared sub-switches connected in parallel with one another, wherein during the soft start period, the plurality of lower gate shared sub-switches are sequentially turned ON according to a predetermined time sequence;
 whereby a surge current occurring during the soft start period is reduced.

9. The power conversion circuit of claim 5, wherein:
 the plurality of upper gate switches include: a first upper gate switch and a second upper gate switch coupled in series between the first power and the switching node, wherein the first upper gate switch and the second upper gate switch are coupled to each other at an upper gate central node;

the plurality of lower gate switches include: a first lower gate switch and a second lower gate switch coupled in series between the switching node and the ground node, wherein the first lower gate switch and the second lower gate switch are coupled to each other at a lower gate central node;

wherein the first upper gate switch and the first lower gate switch are the plurality of shared switches;

wherein the upper gate auxiliary sub-switch is coupled between the second power and the upper gate central node, whereas, the lower gate auxiliary sub-switch is coupled between the second power and the lower gate central node;

wherein the at least one capacitor is coupled between the upper gate central node and the lower gate central node.

10. The power conversion circuit of claim 9, wherein the power conversion circuit repeatedly switches according to a switching period, wherein N is equal to three, such that in the 3-level PWM mode, during a first period of the switching period, the first upper gate switch and the second lower gate switch are ON, whereas, the second upper gate switch and the first lower gate switch are OFF, and, during a second period of the switching period, the first lower gate switch and the second lower gate switch are ON, whereas, the first upper gate switch and the second upper gate switch are OFF, and, during a third period of the switching period, the second upper gate switch and the first lower gate switch are ON, whereas, the first upper gate switch and the second lower gate switch are OFF, and, during a fourth period of the switching period, the first upper gate switch and the second upper gate switch are ON, whereas, the first lower gate switch and the second lower gate switch are OFF, such that a voltage at the switching node is periodically switched among the first voltage, the ground, and ½-fold of the first voltage;

wherein the upper gate auxiliary sub-switch and the lower gate auxiliary sub-switch are always OFF, such that the at least one capacitor is always electrically disconnected from the second power.

11. The power conversion circuit of claim 9, wherein the power conversion circuit repeatedly switches according to a switching period, wherein M is equal to two, such that in the capacitive conversion mode, during a first period of the switching period, the first upper gate switch and the lower gate auxiliary sub-switch are ON, whereas, the upper gate auxiliary sub-switch and the first lower gate switch are OFF, and, during a second period of the switching period, the upper gate auxiliary sub-switch and the first lower gate switch are ON, whereas, the first upper gate switch and the lower gate auxiliary sub-switch are OFF, such that the first end of the at least one capacitor is periodically switched between the first voltage and the second voltage and such that the second end of the at least one capacitor is periodically switched between the second voltage and the ground;

wherein the second upper gate switch and the second lower gate switch are always OFF, such that one end of the inductor is floating.

12. A charging system, comprising:

a power delivery unit, which is configured to operably generate a DC power according to an input power; and a charging circuit connected to the power delivery unit in a removable operation, wherein the charging circuit is configured to operably convert the DC power to a charging power for charging a battery;

wherein the charging circuit includes a power conversion circuit for converting a first power to a second power or converting the second power to the first power, the power conversion circuit including:

an N-level PWM power converter, which is configured to operably switch an inductor and at least one capacitor in an N-level PWM mode, so as to execute power conversion between the first power and the second power; and a switching capacitor power converter, which is configured to operably switch the at least one capacitor in a capacitive conversion mode, so as to execute power conversion between the first power and the second power;

wherein the N-level PWM power converter includes:
a plurality of shared switches shared with the switching capacitor power converter; and
a plurality of PWM switches, wherein in the N-level PWM mode, the plurality of shared switches and the plurality of PWM switches periodically switch the inductor and the at least one capacitor, so as to execute power conversion between the first power and the second power by N-level PWM switching operation, wherein N is an integer greater than or equal to three;

wherein the switching capacitor power converter includes:
the plurality of shared switches; and
a plurality of auxiliary switches, wherein in the capacitive conversion mode, the plurality of shared switches and the plurality of auxiliary switches periodically switch the at least one capacitor, so as to execute power conversion between the first power and the second power by capacitive power conversion operation;

wherein in the capacitive conversion mode, a portion of the plurality of PWM switches are always OFF, such that one end of the inductor is floating;

wherein the first power corresponds to the DC power, whereas, the second power corresponds to the charging power, or wherein the second power corresponds to the DC power, whereas, the first power corresponds to the charging power;

wherein in the N-level PWM mode, the plurality of auxiliary switches are always OFF, such that the at least one capacitor is always OFF at one of the first power and the second power;

wherein the N-level PWM power converter includes:
a plurality of upper gate switches coupled in series between the first power and a switching node, wherein adjacent upper gate switches are coupled to a corresponding upper gate central node in between; and
a plurality of lower gate switches coupled in series between the switching node and a ground node, wherein adjacent lower gate switches are coupled to a corresponding lower gate central node in between;

wherein the switching capacitor power converter includes:
a portion of the plurality of upper gate switches;
a portion of the plurality of lower gate switches, wherein the portion of the plurality of upper gate switches and the portion of the plurality of lower gate switches are the plurality of shared switches;

an upper gate auxiliary sub-switch having a first end coupled to the second power and having a second end coupled to a corresponding one of the upper gate central nodes; and a lower gate auxiliary sub-switch having a first end coupled to the second power and having a second end coupled to a corresponding one of the lower gate central nodes, wherein the upper gate auxiliary sub-switch and the lower gate auxiliary sub-switch are the plurality of auxiliary switches;

wherein the inductor is coupled between the switching node and the second power;

wherein the at least one capacitor has a first end coupled to a corresponding one of the upper gate central nodes and has a second end coupled to a corresponding one of the lower gate central nodes;

wherein in the N-level PWM mode, the plurality of upper gate switches and the plurality of lower gate switches periodically switch the at least one capacitor, so as to generate an N-level voltage at the switching node, so that the inductor executes power conversion between the first power and the second power by N-level PWM switching operation;

wherein in the capacitive conversion mode, the upper gate auxiliary sub-switch, the lower gate auxiliary sub-switch and the plurality of shared switches periodically switch the at least one capacitor, so that the at least one capacitor converts the first power to the second power by capacitive voltage division or so that the at least one capacitor converts the second power to the first power by charge pumping operation.

13. The charging system of claim 12, wherein in the N-level PWM mode, the upper gate auxiliary sub-switch and the lower gate auxiliary sub-switch are both always OFF, such that the at least one capacitor is always electrically disconnected from the second power.

14. The charging system of claim 12, wherein in the capacitive conversion mode, at least one of the plurality of upper gate switches which is not the plurality of shared switches is always OFF and at least one of the plurality of lower gate switches which is not the plurality of shared switches is always OFF, such that one end of the inductor which is coupled to the switching node is floating.

15. The charging system of claim 12, wherein in the N-level PWM mode, a ratio of a first voltage of the first power to a second voltage of the second power is correlated with a duty ratio corresponding to the N-level voltage.

16. The charging system of claim 12, wherein in the capacitive conversion mode, a ratio of a first voltage of the first power to a second voltage of the second power is equal to M, wherein M is a real number greater than one.

17. The charging system of claim 16, wherein M is equal to N minus one.

18. The charging system of claim 16, wherein when the power conversion circuit is configured to operably convert the first power to the second power, in the capacitive conversion mode, a first current of the first power is constant, such that a second current of the second power is constant, wherein the second current is M times the level of the first current.

19. The charging system of claim 16, wherein in the capacitive conversion mode:

an upper gate switch of the plurality of shared switches includes: a plurality of upper gate shared sub-switches connected in parallel with one another, wherein during a soft start period, the plurality of upper gate shared sub-switches are sequentially turned ON according to a predetermined time sequence; and/or a lower gate switch of the plurality of shared switches includes: a plurality of lower gate shared sub-switches connected in parallel with one another, wherein during the soft start period, the plurality of upper gate shared sub-switches are sequentially turned ON according to a predetermined time sequence;

whereby a surge current occurring during the soft start period is reduced.

20. The charging system of claim 16, wherein:

the plurality of upper gate switches include: a first upper gate switch and a second upper gate switch coupled in series between the first power and the switching node, wherein the first upper gate switch and the second upper gate switch are coupled to each other at an upper gate central node;

the plurality of lower gate switches include: a first lower gate switch and a second lower gate switch coupled in series between the switching node and the ground node, wherein the first lower gate switch and the second lower gate switch are coupled to each other at a lower gate central node;

the first upper gate switch and the first lower gate switch correspond to the plurality of shared switches;

wherein the upper gate auxiliary sub-switch is coupled between the second power and the upper gate central node, whereas, the lower gate auxiliary sub-switch is coupled between the second power and the lower gate central node;

wherein the at least one capacitor is coupled between the upper gate central node and the lower gate central node.

21. The charging system of claim 20, wherein the power conversion circuit repeatedly switches according to a switching period, wherein N is equal to three, such that in the 3-level PWM mode, during a first period of the switching period, the first upper gate switch and the second lower gate switch are ON, whereas, the second upper gate switch and the first lower gate switch are OFF, and, during a second period of the switching period, the first lower gate switch and the second lower gate switch are ON, whereas, the first upper gate switch and the second upper gate switch are OFF, and, during a third period of the switching period, the second upper gate switch and the first lower gate switch are ON, whereas, the first upper gate switch and the second lower gate switch are OFF, and, during a fourth period of the switching period, the first upper gate switch and the second upper gate switch are ON, whereas, the first lower gate switch and the second lower gate switch are OFF, such that a voltage at the switching node is periodically switched among the first voltage, the ground, and ½-fold of the first voltage;

wherein the upper gate auxiliary sub-switch and the lower gate auxiliary sub-switch are always OFF, such that the at least one capacitor is always electrically disconnected from the second power.

22. The charging system of claim 20, wherein the power conversion circuit repeatedly switches according to a switching period, wherein M is equal to two, such that in the capacitive conversion mode, during a first period of the switching period, the first upper gate switch and the lower gate auxiliary sub-switch are ON, whereas, the upper gate auxiliary sub-switch and the first lower gate switch are OFF, and, during a second period of the switching period, the upper gate auxiliary sub-switch and the first lower gate switch are ON, whereas, the first upper gate switch and the lower gate auxiliary sub-switch are OFF, such that the first end of the at least one capacitor is periodically switched between the first voltage and the second voltage and such that the second end of the at least one capacitor is periodically switched between the second voltage and the ground;
  wherein the second upper gate switch and the second lower gate switch are always OFF, such that one end of the inductor is floating.

23. A power supply system, comprising:
  a battery, which is configured to operably supply an electrical energy; and
  a power supply circuit coupled to the battery, wherein the power supply circuit is configured to operably convert the electrical energy to a power supply power for proving power to a load;
  wherein the power supply circuit includes a power conversion circuit for converting a first power to a second power or converting the second power to the first power, the power conversion circuit including:
  an N-level PWM power converter, which is configured to operably switch an inductor and at least one capacitor in an N-level PWM mode, so as to execute power conversion between the first power and the second power; and
  a switching capacitor power converter, which is configured to operably switch the at least one capacitor in a capacitive conversion mode, so as to execute power conversion between the first power and the second power;
  wherein the N-level PWM power converter includes:
    a plurality of shared switches shared with the switching capacitor power converter; and
    a plurality of PWM switches, wherein in the N-level PWM mode, the plurality of shared switches and the plurality of PWM switches periodically switch the inductor and the at least one capacitor, so as to execute power conversion between the first power and the second power by N-level PWM switching operation, wherein N is an integer greater than or equal to three;
  wherein the switching capacitor power converter includes:
    the plurality of shared switches; and
    a plurality of auxiliary switches, wherein in the capacitive conversion mode, the plurality of shared switches and the plurality of auxiliary switches periodically switch the at least one capacitor, so as to execute power conversion between the first power and the second power by capacitive power conversion operation;
  wherein in the capacitive conversion mode, a portion of the plurality of PWM switches are always OFF, such that one end of the inductor is floating;
  wherein the first power corresponds to the electrical energy, whereas, the second power corresponds to the power supply power, or wherein the second power corresponds to the electrical energy, whereas, the first power corresponds to the power supply power;
  wherein in the N-level PWM mode, the plurality of auxiliary switches are always OFF, such that the at least one capacitor is always OFF at one of the first power and the second power;
  wherein the N-level PWM power converter includes:
    a plurality of upper gate switches coupled in series between the first power and a switching node, wherein adjacent upper gate switches are coupled to a corresponding upper gate central node in between; and
    a plurality of lower gate switches coupled in series between the switching node and a ground node, wherein adjacent lower gate switches are coupled to a corresponding lower gate central node in between;
  wherein the switching capacitor power converter includes:
    a portion of the plurality of upper gate switches;
    a portion of the plurality of lower gate switches, wherein the portion of the plurality of upper gate switches and the portion of the plurality of lower gate switches are the plurality of shared switches;
    an upper gate auxiliary sub-switch having a first end coupled to the second power and having a second end coupled to a corresponding one of the upper gate central nodes; and
    a lower gate auxiliary sub-switch having a first end coupled to the second power and having a second end coupled to a corresponding one of the lower gate central nodes, wherein the upper gate auxiliary sub-switch and the lower gate auxiliary sub-switch are the plurality of auxiliary switches;
  wherein the inductor is coupled between the switching node and the second power;
  wherein the at least one capacitor has a first end coupled to a corresponding one of the upper gate central nodes and has a second end coupled to a corresponding one of the lower gate central nodes;
  wherein in the N-level PWM mode, the plurality of upper gate switches and the plurality of lower gate switches periodically switch the at least one capacitor, so as to generate an N-level voltage at the switching node, so that the inductor executes power conversion between the first power and the second power by N-level PWM switching operation;
  wherein in the capacitive conversion mode, the upper gate auxiliary sub-switch, the lower gate auxiliary sub-switch and the plurality of shared switches periodically switch the at least one capacitor, so that the at least one capacitor converts the first power to the second power by capacitive voltage division or so that the at least one capacitor converts the second power to the first power by charge pumping operation.

24. The power supply system of claim 23, wherein in the N-level PWM mode, the upper gate auxiliary sub-switch and the lower gate auxiliary sub-switch are both always OFF, such that the at least one capacitor is always electrically disconnected from the second power.

25. The power supply system of claim 23, wherein in the capacitive conversion mode, at least one of the plurality of upper gate switches which is not the plurality of shared switches is always OFF and at least one of the plurality of lower gate switches which is not the plurality of shared switches is always OFF, such that one end of the inductor which is coupled to the switching node is floating.

* * * * *